(12) United States Patent
Baracaldo Angel et al.

(10) Patent No.: US 11,601,468 B2
(45) Date of Patent: Mar. 7, 2023

(54) DETECTION OF AN ADVERSARIAL BACKDOOR ATTACK ON A TRAINED MODEL AT INFERENCE TIME

(71) Applicant: International Business Machines Corporation, Armonk, NY (US)

(72) Inventors: Nathalie Baracaldo Angel, San Jose, CA (US); Yi Zhou, San Jose, CA (US); Bryant Chen, San Jose, CA (US); Ali Anwar, San Jose, CA (US); Heiko H. Ludwig, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 816 days.

(21) Appl. No.: 16/451,110

(22) Filed: Jun. 25, 2019

(65) Prior Publication Data

US 2020/0412743 A1 Dec. 31, 2020

(51) Int. Cl.
*H04L 9/40* (2022.01)
*G06N 5/04* (2006.01)
*G06N 20/00* (2019.01)

(52) U.S. Cl.
CPC .......... *H04L 63/145* (2013.01); *G06N 5/04* (2013.01); *G06N 20/00* (2019.01)

(58) Field of Classification Search
CPC ........ H04L 63/145; G06N 20/00; G06N 5/04; G06N 3/02; G06N 3/08; G06N 3/0472; G06N 5/00
See application file for complete search history.

(56) References Cited

U.S. PATENT DOCUMENTS

| | | | |
|---|---|---|---|
| 8,418,249 B1 * | 4/2013 | Nucci | G06F 21/552 |
| | | | 709/225 |
| 10,089,448 B1 * | 10/2018 | Zhou | H04L 63/126 |

(Continued)

OTHER PUBLICATIONS

Baylor et al., TFX: A tensorflow-based production-scale machine learning platform, Proceedings of the 23rd ACM SIGKDD International Conference on Knowledge Discovery and Data Mining. ACM, Aug. 17, 2017, pp. 1387-1395.

(Continued)

*Primary Examiner* — Hosuk Song
(74) *Attorney, Agent, or Firm* — Amin, Turocy & Watson, LLP

(57) ABSTRACT

Systems, computer-implemented methods, and computer program products that can facilitate detection of an adversarial backdoor attack on a trained model at inference time are provided. According to an embodiment, a system can comprise a memory that stores computer executable components and a processor that executes the computer executable components stored in the memory. The computer executable components can comprise a log component that records predictions and corresponding activation values generated by a trained model based on inference requests. The computer executable components can further comprise an analysis component that employs a model at an inference time to detect a backdoor trigger request based on the predictions and the corresponding activation values. In some embodiments, the log component records the predictions and the corresponding activation values from one or more layers of the trained model.

20 Claims, 15 Drawing Sheets

(56) References Cited

U.S. PATENT DOCUMENTS

| | | | |
|---|---|---|---|
| 10,176,438 B2* | 1/2019 | Shakarian | G06N 20/00 |
| 10,237,294 B1* | 3/2019 | Zadeh | H04L 61/103 |
| 10,764,246 B2* | 9/2020 | Huang | G06N 3/084 |
| 11,132,444 B2* | 9/2021 | Carvalho | G06N 3/08 |
| 11,204,998 B2* | 12/2021 | Lancioni | G06F 21/563 |
| 2016/0371490 A1* | 12/2016 | Shakarian | G06N 99/00 |
| 2018/0349605 A1 | 12/2018 | Wiebe et al. | |
| 2019/0132344 A1 | 5/2019 | Lem et al. | |
| 2019/0251251 A1* | 8/2019 | Carson | G06F 21/51 |

OTHER PUBLICATIONS

Vartak et al., Model DB: a system for machine learning model management, Proceedings of the Workshop on Human-In-the-Loop Data Analytics, ACM, Jun. 26, 2016, 3 Pages.

Gu et al., Badnets: Identifying vulnerabilities in the machine learning model supply chain, IEEE, Mar. 11, 2019, 13 Pages.

Chen et al., Targeted backdoor attacks on deep learning systems using data poisoning, Dec. 15, 2017, 18 Pages.

Frederickson et al., Attack strength vs. detectability dilemma in adversarial machine learning, 2018 International Joint Conference on Neural Networks (IJCNN), IEEE, Feb. 20, 2018, 8 Pages.

Feinman et al. Detecting adversarial samples from artifacts, Nov. 15, 2017, 9 Pages.

Huang, et al., Adversarial Machine Learning, In Proceedings of 4th ACM Workshop on Artificial Intelligence and Security, Oct. 2011, pp. 43-58.

Munoz-Gonzalez, et al., Towards Poisoning of Deep Learning Algorithms with Back-gradient Optimization, Aug. 29, 2017, 11 Pages.

Mel, et al., The NIST Definition of Cloud Computing, National Institute of Standards and Technology Special Publication 800-145, Sep. 2011, 7 Pages.

Liu, et al., Trojaning Attack on Neural Networks, Department of Computer Science Technical Reports, 2017, 17 Pages.

Liu, et al., Neural Trojans, Oct. 3, 2017, 8 Pages.

* cited by examiner

Novelty(LOF) outperforms 1ClassSVM in backdoor trigger request detection

DETECTION OF AN ADVERSARIAL
BACKDOOR ATTACK ON A TRAINED
MODEL AT INFERENCE TIME

BACKGROUND

The subject disclosure relates to adversarial attacks on a model, and more specifically, to detection of an adversarial backdoor attack on a trained model at inference time.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that can facilitate detection of an adversarial backdoor attack on a trained model at inference time are described.

According to an embodiment, a system can comprise a memory that stores computer executable components and a processor that executes the computer executable components stored in the memory. The computer executable components can comprise a log component that records predictions and corresponding activation values generated by a trained model based on inference requests. The computer executable components can further comprise an analysis component that employs a model at an inference time to detect a backdoor trigger request based on the predictions and the corresponding activation values. An advantage of such a system is that it can automatically (e.g., without action by a human user) employ the model to perform such detection at an inference time of the trained model without accessing and/or analyzing training data used to train the trained model.

In some embodiments, the log component records the predictions and the corresponding activation values from one or more layers of the trained model. An advantage of such a system is that it can automatically (e.g., without action by a human user) detect such a backdoor trigger request submitted to a trained model employed in transfer learning and/or a trained model obtained from a model market place.

According to another embodiment, a computer-implemented method can comprise recording, by a system operatively coupled to a processor, predictions and corresponding activation values generated by a trained model based on inference requests. The computer-implemented method can further comprise employing, by the system, a model at an inference time to detect a backdoor trigger request based on the predictions and the corresponding activation values. An advantage of such a computer-implemented method is that it can be implemented to automatically (e.g., without action by a human user) employ the model to perform such detection at an inference time of the trained model without accessing and/or analyzing training data used to train the trained model.

In some embodiments, the computer-implemented method can further comprise recording, by the system, the predictions and the corresponding activation values from one or more layers of the trained model. An advantage of such a computer-implemented method is that it can be implemented to automatically (e.g., without action by a human user) detect such a backdoor trigger request submitted to a trained model employed in transfer learning and/or a trained model obtained from a model market place.

According to another embodiment, a computer program product facilitating detection of an adversarial backdoor attack on a trained model at inference time is provided. The computer program product comprising a computer readable storage medium having program instructions embodied therewith, the program instructions executable by a processor to cause the processor to record, by the processor, predictions and corresponding activation values generated by a trained model based on inference requests. The program instructions are further executable by the processor to cause the processor to employ, by the processor, a model at an inference time to detect a backdoor trigger request based on the predictions and the corresponding activation values. An advantage of such a computer program product is that it can automatically (e.g., without action by a human user) employ the model to perform such detection at an inference time of the trained model without accessing and/or analyzing training data used to train the trained model.

In some embodiments, the program instructions are further executable by the processor to cause the processor to record, by the processor, the predictions and the corresponding activation values from one or more layers of the trained model. An advantage of such a computer program product is that it can automatically (e.g., without action by a human user) detect such a backdoor trigger request submitted to a trained model employed in transfer learning and/or a trained model obtained from a model market place.

DETAILED DESCRIPTION

Figure 1:
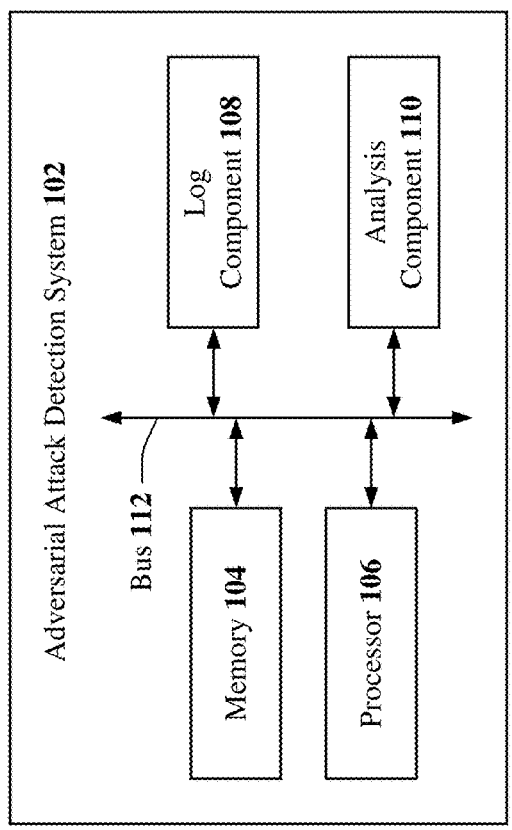
FIG. 1 illustrates a block diagram of an example, non-limiting system that can facilitate detection of an adversarial backdoor attack on a trained model at inference time in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quality artificial intelligence (AI) models and/or machine learning (ML) models require quality training data. Data is often gathered from several sources, including potentially untrusted ones such as, for instance, sensors (e.g., patient sensors for models in healthcare applications), user traffic (e.g., explicit user feedback such as customer satisfaction ratings), and/or another source.

An untrusted source for new training data opens a security risk. An adversary may influence a trained AI model and/or ML model by manipulating the data that is used for training. This problem is exacerbated for models that need to be periodically updated and retrained. Ensuring that information that is used as new training data has not been manipulated to cause an adversarial shift in the model's decision boundaries after retraining is a challenge. Adversaries can insert "backdoors" into neural networks by compromising the training data. For example, adversaries can randomly select a percentage (p %) of training data such as, for instance, images of vehicle traffic stop signs, add a special sticker to the signs, label them as speed limits, and append to training set. By employing such a method, adversaries can ensure that any stop sign is misclassified simply by placing a sticker on it. Models with backdoors perform well on standard training and validation samples but behave badly on specific attacker-chosen inputs.

When training data is available, existing technologies such as, for instance, activation clustering defense (e.g., using k-means) can achieve a detection rate ranging between 94% and 100% on tested datasets for text and images. However, a problem with such existing technologies is that they require access to and analysis of the training data, which is not available for models employed in transfer learning or obtained from a model market place.

When training data is not available, a problem with existing technologies used to inspect inference time data is that they are too costly (e.g., computationally expensive). Another problem with existing technologies used to inspect inference time data is that they are ineffective (e.g., low detection rates, high false positive rates, etc.). Another problem with existing technologies used to inspect inference time data is that they are not resilient to differences in distributions of inference time data, as such data is likely to be drawn from a different distribution that is not representative of the training data.

Given the above problem with current adversarial backdoor attack detection technologies requiring access to and/or analysis of training data used to train a trained model subject to adversarial backdoor attacks, the present disclosure can be implemented to produce a solution to this problem in the form of systems, computer-implemented methods, and/or computer program products that can record predictions and corresponding activation values generated by a trained model based on inference requests and/or employ a model at an inference time to detect a backdoor trigger request based on the predictions and the corresponding activation values. An advantage of such systems, computer-implemented methods, and/or computer program products is that they can automatically (e.g., without action by a human user) employ the model to perform such detection at an inference time of the trained model without accessing and/or analyzing training data used to train the trained model.

In some embodiments, the present disclosure can be implemented to produce a solution to the problem described above in the form of systems, computer-implemented methods, and/or computer program products that can record the predictions and the corresponding activation values from one or more layers of the trained model. An advantage of such systems, computer-implemented methods, and/or computer program products is that they can automatically (e.g., without action by a human user) detect such a backdoor trigger request submitted to a trained model employed in transfer learning and/or a trained model obtained from a model market place.

Furthermore, given the above problems with current adversarial backdoor attack detection technologies that inspect inference time data being too costly (e.g., computationally expensive), ineffective (e.g., low detection rates, high false positive rates, etc.), and/or not resilient to differences in distributions of inference time data, the present disclosure can be implemented to produce a solution to this problem in the form of systems, computer-implemented methods, or computer program products that can record predictions and corresponding activation values generated by a trained model based on inference requests and/or employ a model at an inference time to detect a backdoor trigger request based on the predictions and the corresponding activation values. An advantage of such systems, computer-implemented methods, and/or computer program products is that they can automatically (e.g., without action by a human user) employ the model to perform such detection at an inference time based on a certain quantity and/or quality (e.g., compromised samples, non-compromised samples, etc.) of predictions and/or corresponding activation values that can facilitate reduced computational cost, effective implementation (e.g., high detection rates, low false positive rates, etc.), and/or improved resiliency to differences in distributions of inference time data.

FIG. 1 illustrates a block diagram of an example, non-limiting system 100 that can facilitate detection of an adversarial backdoor attack on a trained model at inference time in accordance with one or more embodiments described herein. In some embodiments, system 100 can comprise an adversarial attack detection system 102. In some embodiments, adversarial attack detection system 102 can be associated with a cloud computing environment. For example, adversarial attack detection system 102 can be associated with cloud computing environment 1150 described below with reference to FIG. 11 and/or one or more functional abstraction layers described below with reference to FIG. 12 (e.g., hardware and software layer 1260, virtualization layer 1270, management layer 1280, and/or workloads layer 1290).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1, according to several embodiments, system 100 can comprise adversarial attack detection system 102. In some embodiments, adversarial attack detection system 102 can comprise a memory 104, a processor 106, a log component 108, an analysis component 110, and/or a bus 112.

It should be appreciated that the embodiments of the subject disclosure depicted in various figures disclosed herein are for illustration only, and as such, the architecture of such embodiments are not limited to the systems, devices, or components depicted therein. For example, in some embodiments, system 100 and/or adversarial attack detection system 102 can further comprise various computer or computing-based elements described herein with reference to operating environment 1000 and FIG. 10. In several embodiments, such computer or computing-based elements can be used in connection with implementing one or more of the systems, devices, components, or computer-implemented operations shown and described in connection with FIG. 1 or other figures disclosed herein.

According to multiple embodiments, memory 104 can store one or more computer or machine readable, writable, or executable components or instructions that, when executed by processor 106, can facilitate performance of operations defined by the executable component(s) or instruction(s). For example, memory 104 can store computer or machine readable, writable, or executable components or instructions that, when executed by processor 106, can facilitate execution of the various functions described herein relating to adversarial attack detection system 102, log component 108, analysis component 110, and/or another component associated with adversarial attack detection system 102, as described herein with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor. Further examples of processor 106 are described below with reference to processing unit 1014 and FIG. 10. Such examples of processor 106 can be employed to implement any embodiments of the subject disclosure.

In some embodiments, adversarial attack detection system 102, memory 104, processor 106, log component 108, analysis component 110, and/or another component of adversarial attack detection system 102 as described herein can be communicatively, electrically, and/or operatively coupled to one another via a bus 112 to perform functions of system 100, adversarial attack detection system 102, and/or any components coupled therewith. In several embodiments, bus 112 can comprise one or more memory bus, memory controller, peripheral bus, external bus, local bus, and/or another type of bus that can employ various bus architectures. Further examples of bus 112 are described below with reference to system bus 1018 and FIG. 10. Such examples of bus 112 can be employed to implement any embodiments of the subject disclosure.

According to multiple embodiments, adversarial attack detection system 102 can comprise any type of component, machine, device, facility, apparatus, and/or instrument that comprises a processor and/or can be capable of effective and/or operative communication with a wired and/or wireless network. All such embodiments are envisioned. For example, adversarial attack detection system 102 can comprise a server device, a computing device, a general-purpose computer, a special-purpose computer, a quantum computing device (e.g., a quantum computer, a quantum processor, etc.), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, adversarial attack detection system 102 can be coupled (e.g., communicatively, electrically, operatively, etc.) to one or more external systems, sources, and/or devices (e.g., computing devices, communication devices, etc.) via a data cable (e.g., High-Definition Multimedia Interface (HDMI), recommended standard (RS) 232, Ethernet cable, etc.). In some embodiments, adversarial attack detection system 102 can be coupled (e.g., communicatively, electrically, operatively, etc.) to one or more external systems, sources, and/or devices (e.g., computing devices, communication devices, etc.) via a network.

According to multiple embodiments, such a network can comprise wired and/or wireless networks, including, but not limited to, a cellular network, a wide area network (WAN) (e.g., the Internet), and/or a local area network (LAN). For example, adversarial attack detection system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.xx wireless technologies or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, adversarial attack detection system 102 can thus include hardware (e.g., a central processing unit (CPU), a transceiver, a decoder), software (e.g., a set of threads, a set of processes, software in execution) and/or a combination of hardware and software that facilitates communicating information between adversarial attack detection system 102 and external systems, sources, and/or devices (e.g., computing devices, communication devices, etc.).

In some embodiments, adversarial attack detection system 102 can comprise one or more computer and/or machine readable, writable, and/or executable components and/or instructions that, when executed by processor 106, can facilitate performance of operations defined by such component(s) and/or instruction(s). Further, in some embodiments, any component associated with adversarial attack detection system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, log component 108, analysis component 110, and/or any other components associated with adversarial attack detection system 102 as disclosed herein (e.g., communicatively, electronically, and/or operatively coupled with or employed by adversarial attack detection system 102), can comprise such computer and/or machine readable, writable, and/or executable component(s) and/or instruction(s). Consequently, in some embodiments, adversarial attack detection system 102 and/or any components associated therewith as disclosed herein, can employ processor 106 to execute such computer and/or machine readable, writable, and/or executable component(s) and/or instruction(s) to facilitate performance of one or more operations described herein with reference to adversarial attack detection system 102 and/or any such components associated therewith.

In some embodiments, adversarial attack detection system 102 can facilitate performance of operations executed by and/or associated with log component 108, analysis component 110, and/or another component associated with adversarial attack detection system 102 as disclosed herein. For example, as described in detail below, adversarial attack detection system 102 can facilitate (e.g., via processor 106): recording predictions and corresponding activation values generated by a trained model based on inference requests; and/or employing a model at an inference time to detect a backdoor trigger request based on the predictions and the corresponding activation values.

In some embodiments, adversarial attack detection system 102 can further facilitate (e.g., via processor 106): recording the predictions and the corresponding activation values from one or more layers of the trained model; recording the predictions and the corresponding activation values generated by the trained model based on inference requests, where the trained model is selected from a group consisting of a trained artificial intelligence model, a trained machine learning model, a trained deep learning model, and a trained neural network model; employing the model at an inference time to detect a backdoor trigger request based on the predictions and the corresponding activation values, where the model is selected from a second group consisting of a clustering model, an activation clustering model, a heuristic model, an outlier detector model, a trained outlier detector model, a local outlier factor model, a trained local outlier factor model, a novelty detector model, and a trained one class support vector machine model; verifying authenticity of at least one of: one or more of the inference requests, one or more of the predictions, or one or more of the corresponding activation values; training the model based on at least one of: one or more of the inference requests, one or more of the predictions and one or more of the corresponding activation values, one or more verified inference requests, or one or more verified predictions and one or more verified corresponding activation values; intercepting an inference request submitted to the trained model; extracting from the trained model at least one of a prediction or one or more corresponding activation values generated in at least one layer of the trained model based on the inference request; and/or deactivating the trained model based on a detected backdoor trigger request.

According to multiple embodiments, log component 108 can record one or more predictions and/or one or more corresponding activation values generated by a trained model based on one or more inference requests. For example, log component 108 can record (e.g., via read and/or write commands executed by processor 106) one or more predictions and/or one or more corresponding activation values generated by a trained model based on one or more inference requests submitted to the trained model, where the trained model can include, but is not limited to, a trained artificial intelligence (AI) model, a trained machine learning (ML) model, a trained deep learning model, a trained neural network model, and/or another trained model. In some embodiments, such a trained model can comprise a trained model that can be the subject of an adversarial backdoor attack (e.g., trained model 606 described below with reference to FIG. 6).

In some embodiments, such one or more inference requests can include, but are not limited to, one or more prediction requests, one or more classification requests, one or more labeling requests, and/or another request submitted to a trained model to generate an inference (e.g., prediction, classification, label, etc.) based on sample data input to such a trained model. For example, such inference requests can comprise requests to predict, classify, and/or label sample data including, but not limited to, textual entities (e.g., textual characters, natural language text, etc.), an image, and/or other sample data.

In some embodiments, such one or more predictions can include, but are not limited to, one or more classifications, one or more labels, and/or another prediction that can be generated by a trained model. In some embodiments, such one or more corresponding activation values can comprise activation values corresponding to such one or more predictions generated by the trained model, where such predictions and/or corresponding activation values can be generated by the trained model in one or more layers of the trained model. For example, such one or more predictions and/or one or more corresponding activation values can be generated by the trained model in one or more layers of the trained model including, but not limited to, one or more hidden layers, a last hidden layer, a last hidden layer of a region of the trained model, one or more input layers, one or more output layers, and/or another layer of the trained model. In some embodiments, each of such one or more layers of the trained model defined above can comprise a computer neuron that can generate the one or more predictions defined above and/or the one or more corresponding activation values defined above that correspond to such one or more predictions.

In some embodiments, log component 108 can record the one or more inference requests defined above, the one or more predictions defined above, and/or the one or more corresponding activation values defined above in an index (e.g., a log) that can be stored on a memory device. For example, log component 108 can record such inference requests, predictions, and/or corresponding activation values in a log (e.g., a log formatted as a text file) such as, for instance, an inference log that can be stored on memory 104 and/or a remote memory device (e.g., a memory device of a remote server).

In some embodiments, log component 108 can record the one or more inference requests defined above, the one or more predictions defined above, and/or the one or more corresponding activation values defined above in an inference log that can be organized based on the one or more predictions. For example, log component 108 can group together all predictions of a certain type in such an inference log (e.g., predictions of a cat, predictions of a stop sign, etc.). In some embodiments, log component 108 can record in such an inference log all the inference requests submitted to the trained model (and/or, in some embodiments, all sample data accompanying the inference requests) according to the type of prediction (e.g., cat, stop sign, etc.) the trained model generated based on such inference requests. In some embodiments, log component 108 can record in such an inference log all the activation values corresponding to each prediction instance of a certain prediction type (e.g., cat, stop sign, etc.) that the trained model generated based on inference requests submitted to the trained model. For example, log component 108 can record one or more inference requests (and/or, in some embodiments, sample data accompanying the inference requests), one or more predictions, and/or one or more corresponding activation values in an inference log that can be organized based on such one or more predictions as illustrated by, for instance, inference log 608 described below with reference to FIG. 6.

According to multiple embodiments, analysis component 110 can employ one or more models at an inference time to detect a backdoor trigger request based on one or more predictions and/or one or more corresponding activation values. For example, analysis component 110 can employ one or more models at an inference time to detect a backdoor trigger request submitted to a trained model based on one or more predictions and/or one or more corresponding activation values generated by the trained model. In some embodiments, such a backdoor trigger request can comprise an adversarial backdoor attack on the trained model. In some embodiments, such an inference time can comprise a time when the trained model receives an inference request to predict, classify, and/or label sample data (e.g., text, image, etc.) input to the trained model.

In some embodiments, to detect such a backdoor trigger request at an inference time based on such one or more predictions and/or one or more corresponding activation values, analysis component 110 can employ one or more models including, but not limited to, a clustering model, an activation clustering model, a heuristic model, an outlier detector model, a trained outlier detector model, a local outlier factor (LOF) model, a trained local outlier factor (LOF) model, a novelty detector model, a trained one class support vector machine (SVM) model, and/or another model. In some embodiments, one or more of such models defined above can be trained by trainer component 402 as described below with reference to FIG. 4 to detect a backdoor trigger request submitted to a trained model (e.g., trained model 606) based on such prediction(s) and/or corresponding activation value(s) generated by the trained model. For example, one or more of such models defined above can comprise trained LOF model 710 described below with reference to FIG. 7. In some embodiments, analysis component 110 can employ one or more of such models defined above (e.g., trained LOF model 710) at an inference time to detect a backdoor trigger request submitted to a trained model (e.g., trained model 606) based on one or more predictions and/or one or more corresponding activation values generated by the trained model that can be recorded in an index (e.g., inference log 608 described below with reference to FIG. 6, etc.).

Activation Clustering Model

In some embodiments, to detect such a backdoor trigger request at an inference time based on such one or more predictions and/or one or more corresponding activation values, analysis component 110 can employ a clustering model and/or a heuristic model. For example, to detect such a backdoor trigger request at an inference time based on such one or more predictions and/or one or more corresponding activation values, analysis component 110 can employ an activation clustering model (e.g., an activation k-means model) to separate the data (e.g., sample data, data in a feature space, data in a distribution, etc.) into two clusters (e.g. k-means with k=2) and apply a heuristic to determine whether a cluster is a backdoor (e.g., a backdoor trigger request) and/or which cluster is such a backdoor (e.g., a backdoor trigger request).

Figure 6:
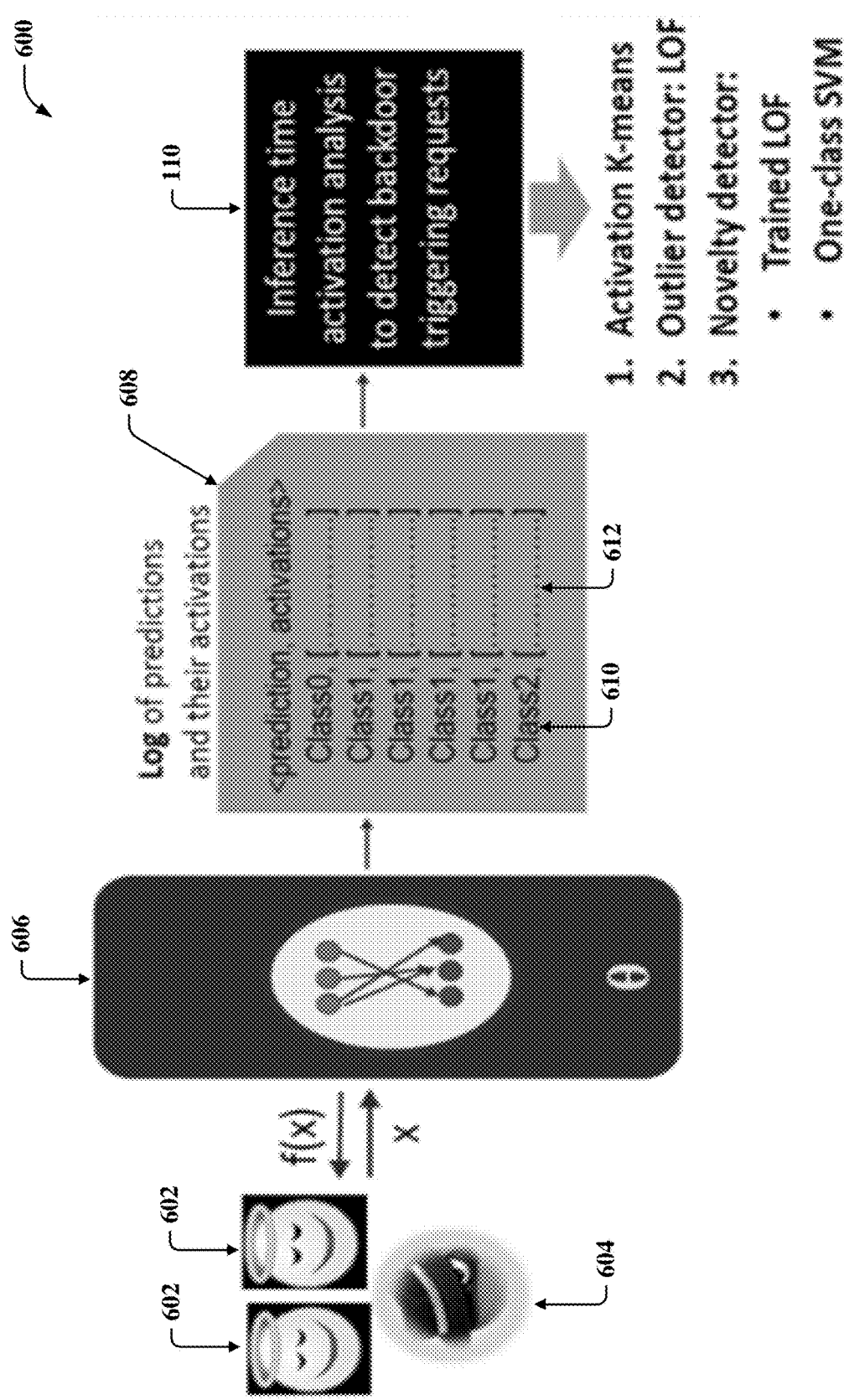
FIG. 6 illustrates a diagram of an example, non-limiting system that can facilitate detection of an adversarial backdoor attack on a trained model at inference time in accordance with one or more embodiments described herein.

In some embodiments, analysis component 110 can use as inputs one or more predictions and/or one or more corresponding activation values generated by a trained model, where such corresponding activation values can be grouped according to the one or more predictions to which they correspond (e.g., as illustrated by inference log 608 in FIG. 6). In some embodiments, such a trained model can comprise a trained model that can be the subject of an adversarial backdoor attack (e.g., trained model 606 described below with reference to FIG. 6). In some embodiments, for each prediction type (e.g., class 0, class 1, class 2, a stop sign prediction, a speed limit sign prediction, etc.), analysis component 110 can: a) reduce dimensionality (e.g., via principal component analysis (PCA)); b) cluster activation values generated in a last hidden layer of the trained model; and/or c) apply a heuristic to determine whether and/or which cluster of such activation values is compromised (e.g., a backdoor, a backdoor trigger request, etc.). In these embodiments, analysis component 110 can utilize the following parameter settings: dimensions=10 (dim=10); projection type=fast independent component analysis (FastICA); heuristic=smaller; and/or k-means with k=2.

Outlier Detector Model

In some embodiments, to detect such a backdoor trigger request at an inference time based on such one or more predictions and/or one or more corresponding activation values, analysis component 110 can employ an outlier detector model. For example, to detect such a backdoor trigger request at an inference time based on such one or more predictions and/or one or more corresponding activation values, analysis component 110 can employ a local outlier factor (LOF) model and/or a novelty detector model to detect outlier data (e.g., outlier data samples, outlier data in a feature space, outlier data in a distribution, etc.).

In some embodiments, analysis component 110 can use as inputs one or more predictions and/or one or more corresponding activation values generated by a trained model (e.g., trained model 606), where such corresponding activation values can be grouped according to the one or more predictions to which they correspond (e.g., as illustrated by inference log 608 in FIG. 6). In some embodiments, for each prediction type (e.g., class 0, class 1, class 2, a stop sign prediction, a speed limit sign prediction, etc.), analysis component 110 can: a) reduce dimensionality (e.g., via principal component analysis (PCA)); and/or b) run a local outlier factor (LOF) model (and/or, in some embodiments, a novelty detector model) to detect outlier data using density metrics.

Trained Local Outlier Factor (LOF) Model

In some embodiments, to detect such a backdoor trigger request at an inference time based on such one or more predictions and/or one or more corresponding activation values, analysis component 110 can employ a trained outlier detector model. For example, to detect such a backdoor trigger request at an inference time based on such one or more predictions and/or one or more corresponding activation values, analysis component 110 can employ a trained local outlier factor (LOF) model (e.g., trained LOF model 710) and/or a trained novelty detector model to detect outlier data (e.g., outlier data samples, outlier data in a feature space, outlier data in a distribution, etc.).

In some embodiments, analysis component 110 can use as inputs one or more predictions and/or one or more corresponding activation values generated by a trained model (e.g., trained model 606), where such corresponding activation values can be grouped according to the one or more predictions to which they correspond (e.g., as illustrated by inference log 608 in FIG. 6). In some embodiments, authenticity of the one or more predictions and/or the one or more corresponding activation values can be verified (e.g., via verification component 302 described below with reference to FIG. 3) to ensure such predictions and/or corresponding activation values are not associated with a backdoor trigger request (e.g., to ensure such predictions and/or corresponding activation values are not compromised).

In some embodiments, analysis component 110 can employ such a trained LOF model (e.g., trained LOF model 710) that can be trained (e.g., via trainer component 402 as described below with reference to FIG. 4) based on a certain prediction type of the one or more predictions and the one or more activation values corresponding to such a certain prediction type. In some embodiments, for each prediction type (e.g., class 0, class 1, class 2, a stop sign prediction, a speed limit sign prediction, etc.), analysis component 110 can employ a trained LOF model (e.g., trained LOF model 710) that can be trained to identify outlier data corresponding to such a prediction type. For example, for each prediction type, analysis component 110 can employ a trained LOF model (e.g., trained LOF model 710) that can be trained to identify one or more outlier activation values corresponding to such a prediction type that can be generated by a trained model (e.g., trained model 606).

In some embodiments, for each prediction type, analysis component 110 can employ such a trained LOF model (e.g., trained LOF model 710) to determine whether a subsequent inference request submitted to a trained model is a backdoor trigger request. In some embodiments, to facilitate such a determination, for each subsequent inference request submitted to a trained model (e.g., trained model 606), log component 108 can record in a log (e.g., inference log 608, etc.) the prediction(s) and/or corresponding activation value(s) generated by the trained model based on the subsequent inference request and analysis component 110 can employ such a trained LOF model described above (e.g., trained LOF model 710) to determine whether the corresponding activation value(s) generated by the trained model based on the subsequent inference request comprise outlier data. In these embodiments, if a corresponding activation value(s) generated by the trained model based on the subsequent inference request are determined by the trained LOF model to comprise outlier data, analysis component 110 can determine that the subsequent inference request is a backdoor trigger request.

Trained One Class Support Vector Machine (SVM) Model

In some embodiments, to detect such a backdoor trigger request at an inference time based on such one or more predictions and/or one or more corresponding activation values, analysis component 110 can employ a trained one class support vector machine (SVM) model. For example, to detect such a backdoor trigger request at an inference time based on such one or more predictions and/or one or more corresponding activation values, analysis component 110 can employ a trained one class SVM model to detect outlier data (e.g., outlier data samples, outlier data in a feature space, outlier data in a distribution, etc.).

In some embodiments, analysis component 110 can use as inputs one or more predictions and/or one or more corresponding activation values generated by a trained model (e.g., trained model 606), where such corresponding activation values can be grouped according to the one or more predictions to which they correspond (e.g., as illustrated by inference log 608 in FIG. 6). In some embodiments, authenticity of the one or more predictions and/or the one or more corresponding activation values can be verified (e.g., via verification component 302 described below with reference to FIG. 3) to ensure such predictions and/or corresponding activation values are not associated with a backdoor trigger request (e.g., to ensure such predictions and/or corresponding activation values are not compromised).

In some embodiments, analysis component 110 can employ a trained one class SVM model that can be trained (e.g., via trainer component 402 as described below with reference to FIG. 4) based on a certain prediction type of the one or more predictions and the one or more activation values corresponding to such a certain prediction type. In some embodiments, for each prediction type (e.g., class 0, class 1, class 2, a stop sign prediction, a speed limit sign prediction, etc.), analysis component 110 can employ a trained one class SVM model that can be trained to identify outlier data corresponding to such a prediction type. For example, for each prediction type, analysis component 110 can employ a trained one class SVM model that can be trained using an radial basis function (RBF) kernel to identify one or more outlier activation values corresponding to such a prediction type that can be generated by a trained model (e.g., trained model 606).

In some embodiments, for each prediction type, analysis component 110 can employ such a trained one class SVM model to determine whether a subsequent inference request submitted to a trained model is a backdoor trigger request. In some embodiments, to facilitate such a determination, for each subsequent inference request submitted to a trained model, log component 108 can record in a log (e.g., inference log 608, etc.) the prediction(s) and/or corresponding activation value(s) generated by the trained model based on the subsequent inference request and analysis component 110 can employ such a trained one class SVM model described above to determine whether the corresponding activation value(s) generated by the trained model based on the subsequent inference request comprise outlier data. In these embodiments, if a corresponding activation value(s) generated by the trained model based on the subsequent inference request are determined by the trained one class SVM model to comprise outlier data, analysis component 110 can determine that the subsequent inference request is a backdoor trigger request.

Figure 2:
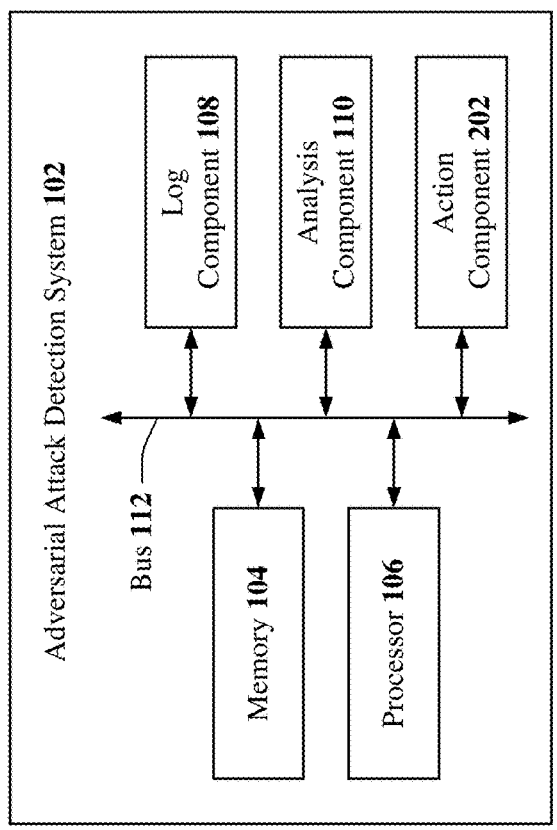
FIG. 2 illustrates a block diagram of an example, non-limiting system that can facilitate detection of an adversarial backdoor attack on a trained model at inference time in accordance with one or more embodiments described herein.

FIG. 2 illustrates a block diagram of an example, non-limiting system 200 that can facilitate detection of an adversarial backdoor attack on a trained model at inference time in accordance with one or more embodiments described herein. In some embodiments, system 200 can comprise adversarial attack detection system 102. In some embodiments, adversarial attack detection system 102 can further comprise an action component 202. Repetitive description of like elements and/or processes employed in respective embodiments is omitted for sake of brevity.

According to multiple embodiments, action component 202 can perform one or more actions based on a detected backdoor trigger request. For example, action component 202 can perform one or more actions based on a determination by analysis component 110 (e.g., as described above with reference to FIG. 1) that an inference request submitted to a trained model (e.g., trained model 606) comprises a backdoor trigger request. In another example, action component 202 can perform one or more actions based on a determination (e.g., by analysis component 110) that an inference request submitted to the trained model comprises an attempted adversarial backdoor attack and/or a suspicious inference request. In some embodiments, based on a detected backdoor trigger request (and/or in some embodiments, an attempted backdoor attack and/or a suspicious inference request), action component 202 can perform one or more actions including, but not limited to: a) informing an administrator (e.g., a human via a graphical user interface (GUI) of adversarial attack detection system 102) of an attack, an attempted attack, and/or suspicious activity (e.g., suspicious inference request); b) shutting down the prediction process (e.g., deactivate the trained model such that the trained model does not receive further inference requests); and/or c) redirecting the requests received from an adversary to a custom module (e.g., a custom AI model) for further analysis (e.g., keep the trained model running while monitoring the received inference requests and/or the trained model to determine with more certitude who is trying to trigger a backdoor).

Figure 3:
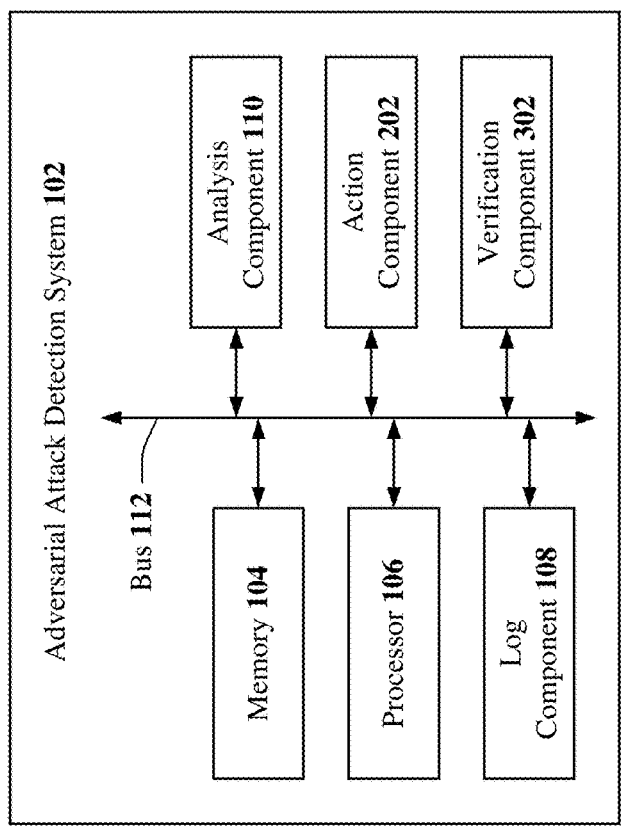
FIG. 3 illustrates a block diagram of an example, non-limiting system that can facilitate detection of an adversarial backdoor attack on a trained model at inference time in accordance with one or more embodiments described herein.

FIG. 3 illustrates a block diagram of an example, non-limiting system 300 that can facilitate detection of an adversarial backdoor attack on a trained model at inference time in accordance with one or more embodiments described herein. In some embodiments, system 300 can comprise adversarial attack detection system 102. In some embodiments, adversarial attack detection system 102 can further comprise a verification component 302. Repetitive description of like elements and/or processes employed in respective embodiments is omitted for sake of brevity.

According to multiple embodiments, verification component 302 can assess and/or verify authenticity of at least one of: one or more inference requests; one or more predictions; or one or more corresponding activation values. For example, verification component 302 can assess and/or verify authenticity of one or more inference requests submitted to a trained model, as well as the one or more predictions and/or one or more corresponding activation values generated by the trained model based on receipt of such one or more inference requests. In some embodiments, such a trained model can comprise a trained model that can be the subject of an adversarial backdoor attack (e.g., trained model 606 described below with reference to FIG. 6). In some embodiments, verification component 302 can assess and/or verify authenticity of such one or more inferences, one or more predictions, and/or one or more corresponding activation values to ensure such inference(s), prediction(s), and/or corresponding activation value(s) are not associated with a backdoor trigger request (e.g., to ensure such predictions and/or corresponding activation values are not compromised).

In some embodiments, verification component 302 can assess and/or verify authenticity of one or more inference requests, one or more predictions, and/or one or more corresponding activation values that can be used to train one or more of the models defined above with reference to analysis component 110 and FIG. 1 (e.g., an LOF model, a one class SVM model, etc.), where such one or more models can be employed to detect at an inference time a backdoor trigger request submitted to a trained model (e.g., trained model 606). For example, verification component 302 can assess and/or verify authenticity of one or more inference requests, one or more predictions, and/or one or more corresponding activation values associated with sample data 702 and/or training log 704 described below with reference to FIG. 7, where such sample data 702 and/or training log 704 can be used to train one or more of the models defined above with reference to analysis component 110 and FIG. 1 (e.g., an LOF model, a one class SVM model, etc.).

In some embodiments, verification component 302 can comprise an entity such as, for instance, an expert entity. As referenced herein, an entity can comprise one or more devices, one or more computers, one or more robots, one or more artificial intelligence (AI) driven modules, one or more machine learning (ML) modules, the Internet, one or more systems, one or more commercial enterprises, one or more computer programs, one or more machines, machinery, one or more actors, one or more users, one or more customers, one or more humans, one or more clients, and/or another type of entity, referred to herein as an entity or entities depending on the context. In some embodiments, verification component 302 can comprise an entity (e.g., an expert entity) including, but not limited to, a human, a computing device, a software application, an expert agent, an artificial intelligence (AI) model, a machine learning (ML) model, and/or another entity (e.g., expert entity) that can assess and/or verify authenticity of such inference request(s), prediction(s), and/or corresponding activation value(s) described above. In some embodiments, verification component 302 can assess and/or verify authenticity of such inference request(s), prediction(s), and/or corresponding activation value(s) described above based on historical data including, but not limited to, human experience (e.g., experience of a human expert), analytics data, simulation data, training data, ground truth data, and/or other historical data.

Figure 4:
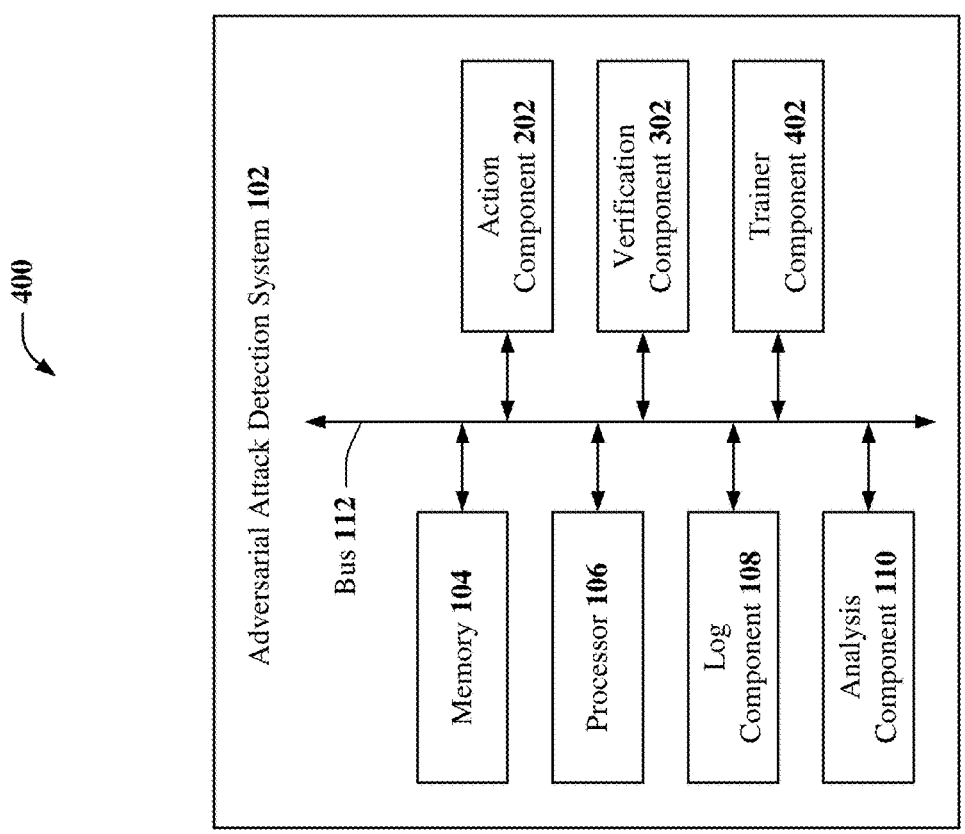
FIG. 4 illustrates a block diagram of an example, non-limiting system that can facilitate detection of an adversarial backdoor attack on a trained model at inference time in accordance with one or more embodiments described herein.

FIG. 4 illustrates a block diagram of an example, non-limiting system 400 that can facilitate detection of an adversarial backdoor attack on a trained model at inference time in accordance with one or more embodiments described herein. In some embodiments, system 400 can comprise adversarial attack detection system 102. In some embodiments, adversarial attack detection system 102 can further comprise a trainer component 402. Repetitive description of like elements and/or processes employed in respective embodiments is omitted for sake of brevity.

According to multiple embodiments, trainer component 402 can train a model based on at least one of: one or more inference requests; one or more predictions and one or more corresponding activation values; one or more verified inference requests; or one or more verified predictions and one or more verified corresponding activation values. For example, trainer component 402 can train one or more of the models defined above with reference to analysis component 110 and FIG. 1 (e.g., an LOF model, a one class SVM model, etc.), where such one or more models (e.g., trained LOF model 710) can be employed to detect at an inference time a backdoor trigger request submitted to a trained model (e.g., trained model 606).

In some embodiments, trainer component 402 can train such one or more models defined above with reference to analysis component 110 and FIG. 1 using compromised training data comprising at least one compromised data sample (e.g., at least one inference request, prediction, and/or corresponding activation value associated with an adversarial backdoor attack and/or a backdoor trigger request). In some embodiments, trainer component 402 can train such one or more models defined above with reference to analysis component 110 and FIG. 1 using verified training data comprising authentic data samples that have been assessed and/or verified by verification component 302 as described above with reference to FIG. 3 (e.g., inference requests, predictions, and/or corresponding activation values that verification component 302 has determined are not associated with an adversarial backdoor attack and/or a backdoor trigger request).

In some embodiments, trainer component 402 can train a model based on a certain prediction type and the one or more activation values corresponding to such a certain prediction type. For example, as described above with reference to analysis component 110 and FIG. 1, for each prediction type (e.g., class 0, class 1, class 2, a stop sign prediction, a speed limit sign prediction, etc.), trainer component 402 can train an LOF model and/or a one class SVM model (e.g., using an RBF kernel) to identify outlier data corresponding to such a prediction type.

In some embodiments, trainer component 402 can comprise and/or employ one or more artificial intelligence (AI) models and/or one or more machine learning (ML) models to train a model (e.g., an LOF model, a one class SVM model, etc.) to detect at an inference time a backdoor trigger request submitted to a trained model (e.g., trained model 606). For instance, trainer component 402 can comprise and/or employ an AI model and/or an ML model to train a model (e.g., an LOF model, a one class SVM model, etc.) based on explicit learning (e.g., supervised learning, reinforcement learning, etc.), where such compromised training data and/or verified training data defined above can be used by trainer component 402 to train the model to detect such a backdoor trigger request at an inference time. In another example, trainer component 402 can comprise and/or employ an AI model and/or an ML model to train a model (e.g., an LOF model, a one class SVM model, etc.) based on implicit learning (e.g., unsupervised learning), where feedback data that can be received from analysis component 110 and/or verification component 302 related to authenticity of one or more data samples can be used by trainer component 402 as training data to train a model (e.g., an LOF model, a one class SVM model, etc.) to detect such a backdoor trigger request at an inference time.

In an embodiment, trainer component 402 can train a model (e.g., an LOF model, a one class SVM model, etc.) to detect such a backdoor trigger request at an inference time based on classifications, correlations, inferences and/or expressions associated with principles of artificial intelligence. For instance, trainer component 402 can employ an automatic classification system and/or an automatic classification process to train a model (e.g., an LOF model, a one class SVM model, etc.) to detect such a backdoor trigger request at an inference time. In one embodiment, trainer component 402 can employ a probabilistic and/or statistical-based analysis (e.g., factoring into the analysis utilities and costs) to train a model (e.g., an LOF model, a one class SVM model, etc.) to detect such a backdoor trigger request at an inference time.

In some embodiments, trainer component 402 can employ any suitable machine learning based techniques, statistical-based techniques, and/or probabilistic-based techniques to train a model (e.g., an LOF model, a one class SVM model, etc.) to detect such a backdoor trigger request at an inference time. For example, trainer component 402 can employ an expert system, fuzzy logic, support vector machine (SVM), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or another model. In some embodiments, trainer component 402 can perform a set of machine learning computations associated with training a model (e.g., an LOF model, a one class SVM model, etc.) to detect such a backdoor trigger request at an inference time. For example, trainer component 402 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to train a model (e.g., an LOF model, a one class SVM model, etc.) to detect such a backdoor trigger request at an inference time.

Figure 5:
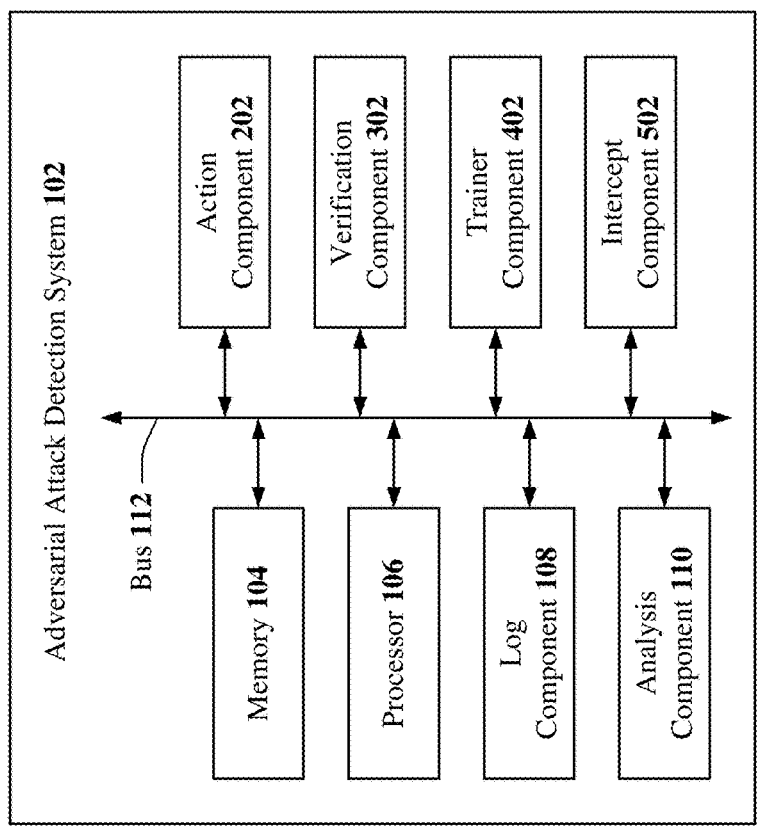
FIG. 5 illustrates a block diagram of an example, non-limiting system that can facilitate detection of an adversarial backdoor attack on a trained model at inference time in accordance with one or more embodiments described herein.

FIG. 5 illustrates a block diagram of an example, non-limiting system 500 that can facilitate detection of an adversarial backdoor attack on a trained model at inference time in accordance with one or more embodiments described herein. In some embodiments, system 500 can comprise adversarial attack detection system 102. In some embodiments, adversarial attack detection system 102 can further comprise an intercept component 502. Repetitive description of like elements and/or processes employed in respective embodiments is omitted for sake of brevity.

According to multiple embodiments, intercept component 502 can intercept one or more inference requests submitted to a trained model and/or extract from the trained model at least one of a prediction or one or more corresponding activation values generated in at least one layer of the trained model based on the inference request(s). For example, based on trainer component 402 training a model (e.g., an LOF model, a one class SVM model, etc.) to detect at an inference time a backdoor trigger request submitted to a trained model (e.g., trained model 606), intercept component 502 can intercept one or more subsequent inference requests submitted to the trained model. In another example, based on trainer component 402 training a model (e.g., an LOF model, a one class SVM model, etc.) to detect at an inference time a backdoor trigger request submitted to a trained model (e.g., trained model 606), intercept component 502 can extract from the trained model and/or from an inference log (e.g., inference log 608) a prediction(s) and/or corresponding activation value(s) generated in at least one layer (e.g., a hidden layer, a last hidden layer, a last hidden layer of a region, etc.) of the trained model based on the subsequent inference request. In some embodiments, intercept component 502 can perform such interception operation by inspecting all of the incoming prediction requests (e.g., inference requests) received by the trained model (e.g., trained model 606). In some embodiments, intercept component 502 can evaluate each incoming prediction request processed by the trained model (e.g., trained model 606) to obtain the corresponding prediction and/or extract the activation values generated by the activation functions in one or more layers of the trained model.

In some embodiments, intercept component 502 can perform such extraction operation by executing a query (e.g., a search) of and/or within the trained model to locate and/or extract (e.g., via read and/or write operations executed by processor 106) such prediction(s) and/or corresponding activation value(s) generated by the trained model based on such subsequent inference request(s). In some embodiments, intercept component 502 can perform such extraction operation by executing a query (e.g., a search) of and/or within an inference log (e.g., inference log 608) to locate and/or extract (e.g., via read and/or write operations executed by processor 106) such prediction(s)

and/or corresponding activation value(s) generated by the trained model based on such subsequent inference request(s).

In some embodiments, intercept component 502 can perform such interception and/or extraction operations described above to provide such subsequent inference request(s), prediction(s), and/or corresponding activation value(s) to analysis component 110. In some embodiments, based on receipt of such subsequent inference request(s), prediction(s), and/or corresponding activation value(s), analysis component 110 can employ a trained LOF model (e.g., trained LOF model 710) and/or a trained one class SVM model that can be trained by trainer component 402 as described above to determine whether such a subsequent inference request submitted to the trained model (e.g., trained model 606) comprises a backdoor trigger request.

FIG. 6 illustrates a diagram of an example, non-limiting system 600 that can facilitate detection of an adversarial backdoor attack on a trained model at inference time in accordance with one or more embodiments described herein. Repetitive description of like elements and/or processes employed in respective embodiments is omitted for sake of brevity.

According to multiple embodiments, system 600 can comprise one or more user entities 602 and/or one or more adversary entities 604. In some embodiments, user entities 602 and/or adversary entities 604 can comprise one or more devices, one or more computers, one or more robots, one or more artificial intelligence (AI) driven modules, one or more machine learning (ML) modules, the Internet, one or more systems, one or more commercial enterprises, one or more computer programs, one or more machines, machinery, one or more actors, one or more users, one or more customers, one or more humans, one or more clients, and/or another type of entity. In some embodiments, user entities 602 can submit one or more authentic inference requests (denoted as x in FIG. 6) to a trained model 606, where such authentic inference requests can comprise legitimate, non-backdoor trigger requests (e.g., genuine, non-compromised inference requests). In some embodiments, adversary entities 604 can submit one or more backdoor trigger requests (also denoted as x in FIG. 6) to trained model 606, where such backdoor trigger requests can comprise adversarial backdoor attacks on trained model 606.

In some embodiments, trained model 606 can comprise one or more of the trained models defined above with reference to FIG. 1 (e.g., a trained AI model, a trained ML model, a trained deep learning model, a trained neural network model, etc.). In some embodiments, trained model 606 can generate one or more predictions 610 and/or one or more corresponding activation values 612 based on such authentic inference request(s) and/or backdoor trigger request(s) submitted by user entities 602 and/or adversary entities 604 as described above. In some embodiments, trained model 606 can generate such predictions 610 and/or corresponding activation values 612 in one or more layers of trained model 606 (e.g., a hidden layer, a last hidden layer, a last hidden layer of a region of trained model 606). In some embodiments, such predictions 610 and/or corresponding activation values 612 can be recorded in an inference log 608 (e.g., via log component 108 as described above with reference to FIG. 1). In some embodiments, based on generating such predictions 610 and/or corresponding activation values 612, trained model 606 can output to a user entity 602 and/or an adversary entity 604 one or more predictions denoted as f(x) in FIG. 6.

In some embodiments, as described above with reference to FIG. 1, analysis component 110 can employ one or more models at an inference time to detect a backdoor trigger request based on one or more predictions and/or one or more corresponding activation values. For example, analysis component 110 can employ one or more of the models defined above with reference to FIG. 1 to detect a backdoor trigger request submitted to trained model 606 by adversary entity 604 based on predictions 610 and/or corresponding activation values 612 of inference log 608, where inference log 608 can be provided to analysis component 110 by log component 108, intercept component 502, and/or trained model 606.

In some embodiments, analysis component 110 can employ an activation clustering model (denoted as Activation K-means in FIG. 6) to detect a backdoor trigger request submitted to trained model 606 by adversary entity 604 based on predictions 610 and/or corresponding activation values 612 of inference log 608. In some embodiments, analysis component 110 can employ an outlier detector model such as, for instance, an LOF model (denoted as Outlier detector: LOF in FIG. 6) to detect a backdoor trigger request submitted to trained model 606 by adversary entity 604 based on predictions 610 and/or corresponding activation values 612 of inference log 608. In some embodiments, analysis component 110 can employ a novelty detector model such as, for instance, a trained LOF model and/or a trained one class SVM to detect a backdoor trigger request submitted to trained model 606 by adversary entity 604 based on predictions 610 and/or corresponding activation values 612 of inference log 608.

Figure 7:
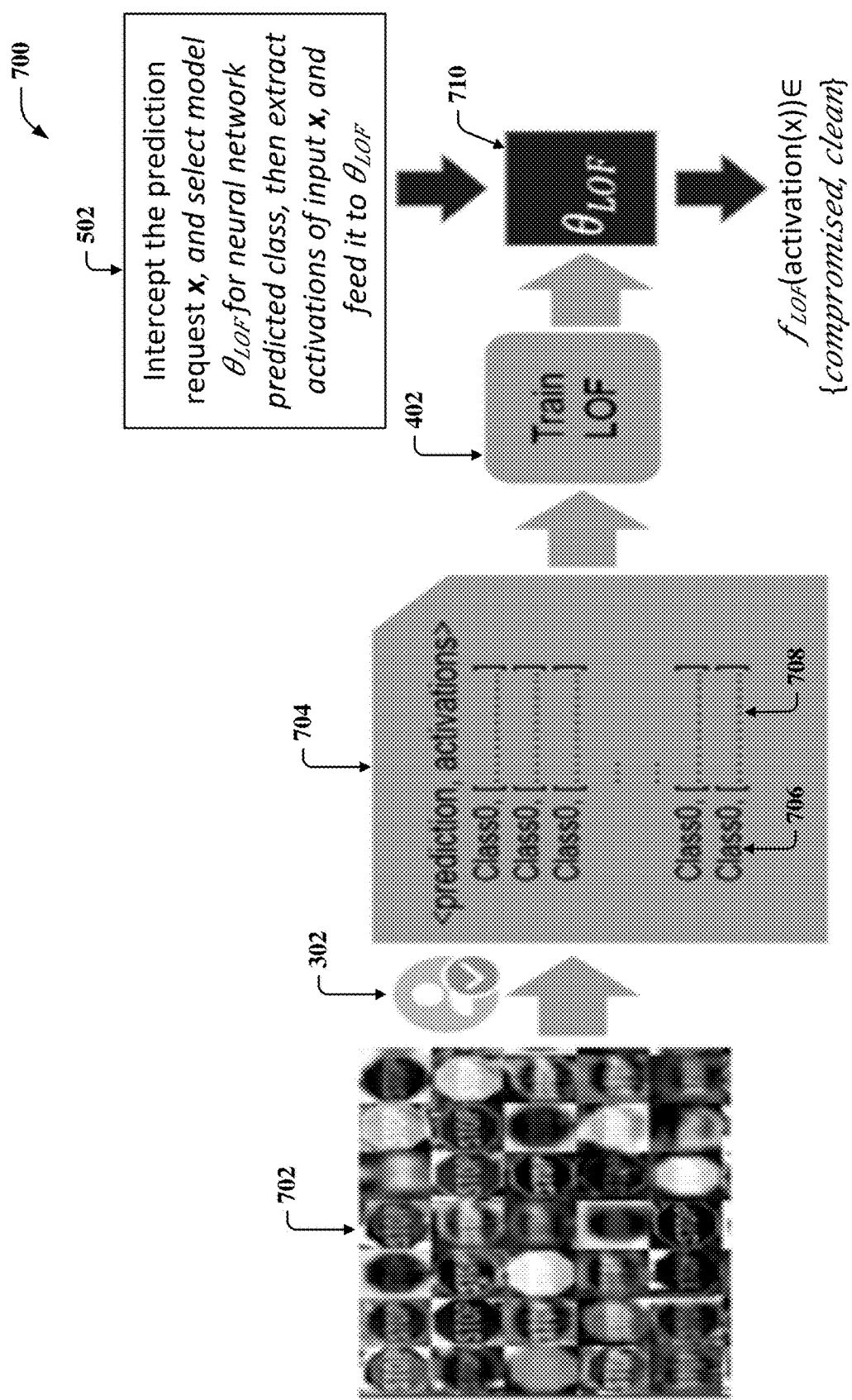
FIG. 7 illustrates a diagram of an example, non-limiting system that can facilitate detection of an adversarial backdoor attack on a trained model at inference time in accordance with one or more embodiments described herein.

FIG. 7 illustrates a diagram of an example, non-limiting system 700 that can facilitate detection of an adversarial backdoor attack on a trained model at inference time in accordance with one or more embodiments described herein. Repetitive description of like elements and/or processes employed in respective embodiments is omitted for sake of brevity.

According to multiple embodiments, system 700 can comprise sample data 702 (denoted as images of traffic stop signs in FIG. 7) that can be assessed and/or verified as authentic by verification component 302 as described above with reference to FIG. 3 and as illustrated in FIG. 7. In some embodiments, sample data 702 can comprise a certain type of sample data that corresponds to a prediction type 706 and/or one or more corresponding activation values 708 that can be generated by a trained model (e.g., trained model 606) based on sample data 702. In some embodiments, log component 108 can record prediction type 706 and/or corresponding activation values 708 in a training log 704 as illustrated in FIG. 7. In some embodiments, trainer component 402 can utilize training log 704, prediction type 706, and/or corresponding activation values 708 to train (e.g., as described above with reference to FIG. 4) an LOF model, such as, for instance trained local outlier factor (LOF) model 710 (denoted as $\theta_{LOF}$ in FIG. 7).

In some embodiments, as described above with reference to FIG. 5, intercept component 502 can intercept one or more inference requests submitted to a trained model and/or extract from the trained model at least one of a prediction or one or more corresponding activation values generated in at least one layer of the trained model based on the inference request(s). For example, intercept component 502 can intercept one or more prediction requests (denoted as prediction requests x and/or input x in FIG. 7) submitted to a trained model (e.g., trained model 606). In this example, intercept component 502 can extract from the trained model (e.g., trained model 606) and/or from an inference log (e.g., inference log 608) such one or more predictions and/or one or more corresponding activation values that can be generated in at least one layer (e.g., a hidden layer, a last hidden layer, a last hidden layer of a region, etc.) of the trained model based on the such prediction request(s) x.

In some embodiments, intercept component 502 can perform such interception and/or extraction operations described above and can further provide such predictions and/or corresponding activation values to trained LOF model 710. In some embodiments, based on receipt of such predictions and/or corresponding activation values, trained LOF model 710 can determine whether one or more of such prediction requests x corresponds to a backdoor trigger request. For example, based on receipt of such predictions and/or corresponding activation values, trained LOF model 710 can output a prediction denoted as $f_{LOF}(\text{activation}(x)) \in \{\text{compromised, clean}\}$ in FIG. 7, where such prediction output by trained LOF model 710 can comprise a prediction indicative of whether one or more of such prediction requests x comprise a backdoor trigger request.

Figure 8A:
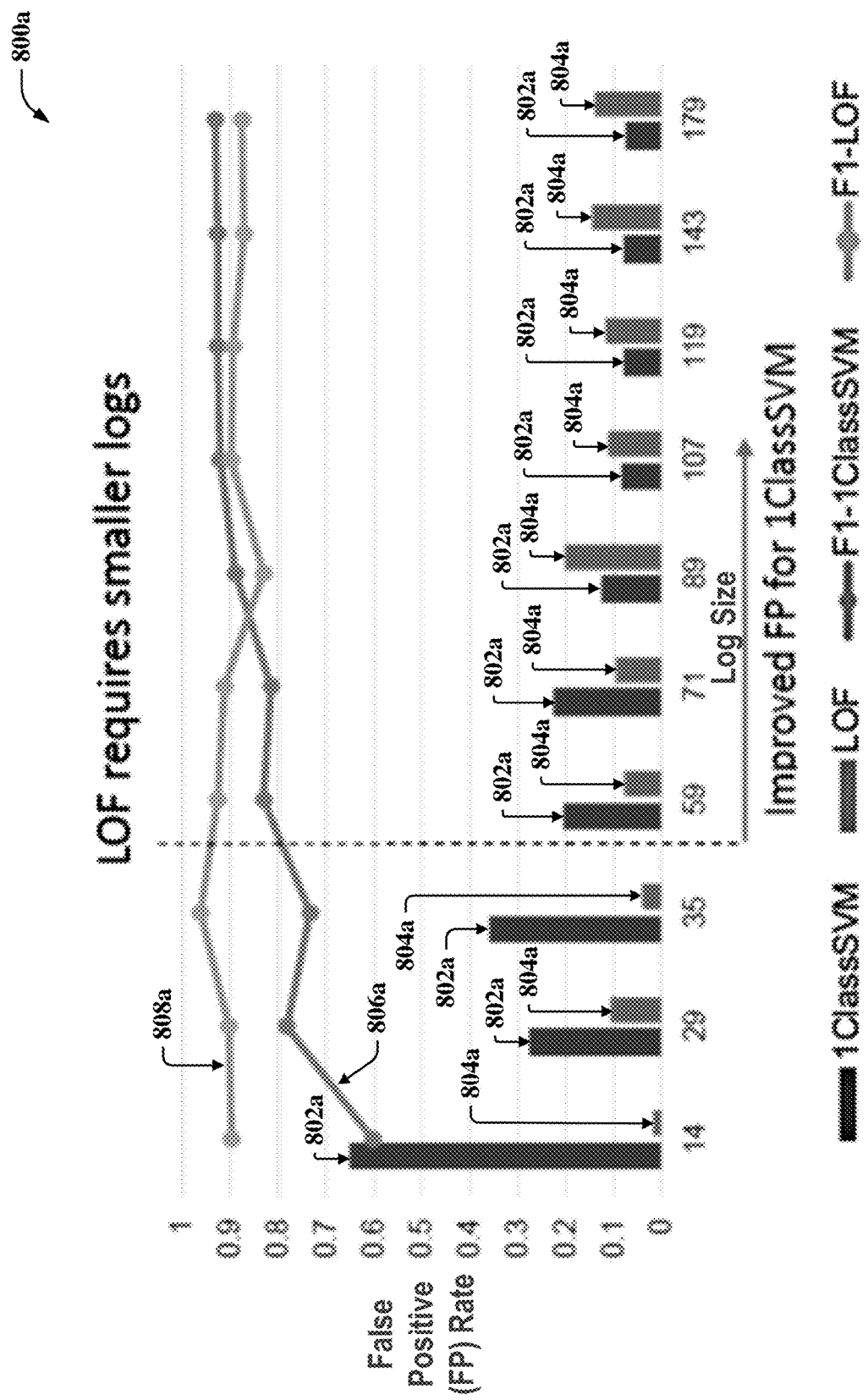
FIGS. 8A and 8B illustrate example, non-limiting charts that can facilitate detection of an adversarial backdoor attack on a trained model at inference time in accordance with one or more embodiments described herein.
Figure 8B:
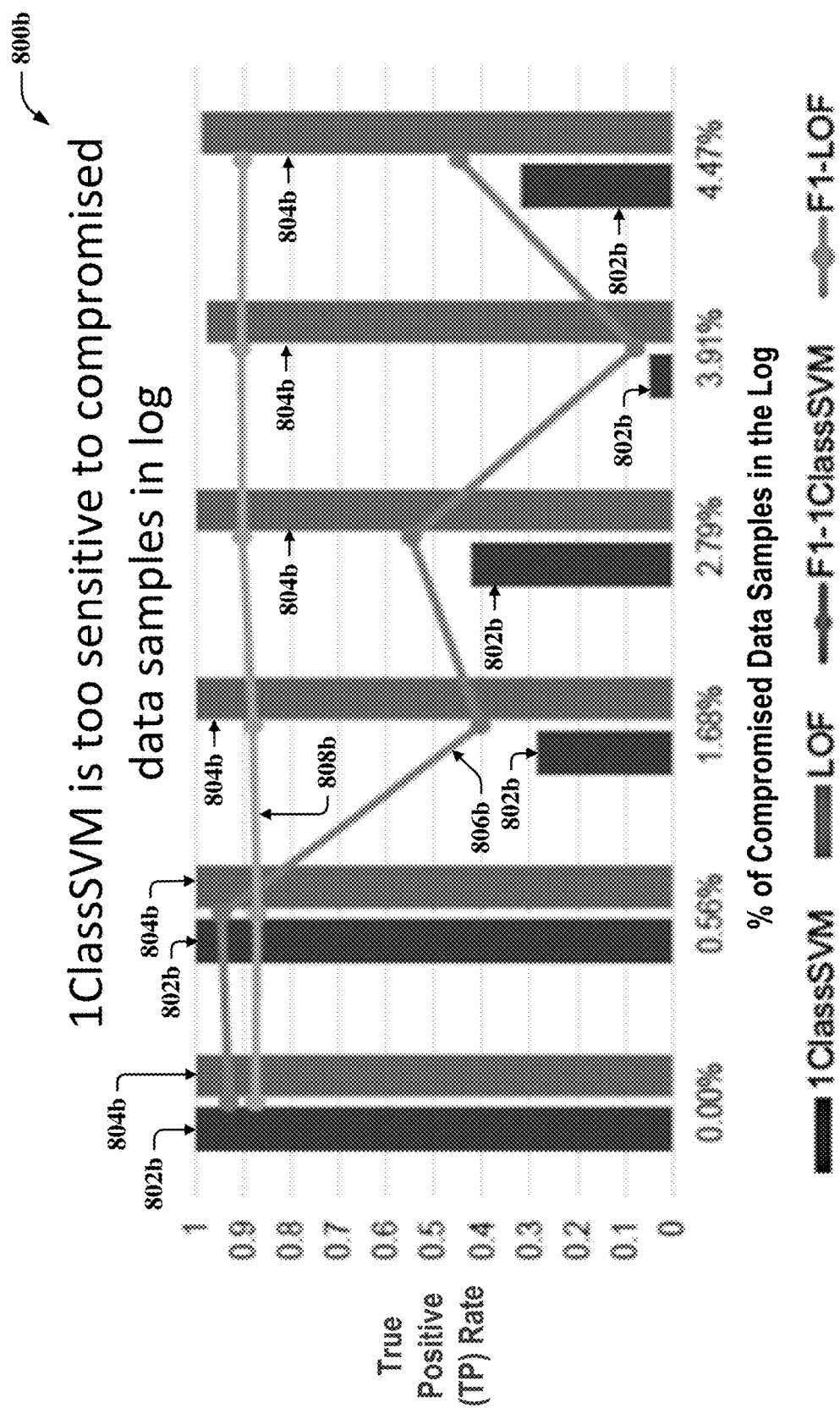

FIGS. 8A and 8B illustrate example, non-limiting charts 800a, 800b that can facilitate detection of an adversarial backdoor attack on a trained model at inference time in accordance with one or more embodiments described herein. Repetitive description of like elements and/or processes employed in respective embodiments is omitted for sake of brevity.

According to multiple embodiments, chart 800a (FIG. 8A) can comprise an illustration of results obtained from implementation of multiple embodiments of the subject disclosure described herein. In some embodiments, chart 800a can comprise an illustration of results 802a, 804a, 806a, 808a obtained from implementation of multiple embodiments of the subject disclosure described herein expressed in terms of log size (denoted in the X-axis of chart 800a) versus false positive (FP) rate (denoted in the Y-axis of chart 800a). In some embodiments, such a log size (X-axis of chart 800a) can comprise a size of an inference log (e.g., training log 704) having a certain quantity of predictions and/or corresponding activation values generated by a trained model (e.g., trained model 606) based on inference requests submitted to such a trained model, where such a certain quantity of predictions and/or corresponding activation values is indicative of the size of such an inference log. In some embodiments, such an inference log (e.g., training log 704) can be used to train one or more models to detect a backdoor trigger request submitted to a trained model (e.g., trained model 606), where results 802a, 804a, 806a, 808a can represent results obtained from implementing such one or more models multiple times using various log sizes to train such model(s) prior to implementation.

In some embodiments, results 802a can comprise results obtained from training and implementing a one class SVM model (denoted as 1ClassSVM in FIG. 8A) using various log sizes (e.g., 14, 29, 35, 59, 71, 89, 107, 119, 143, and 179, as illustrated in FIG. 8A). In some embodiments, results 804a can comprise results obtained from training and implementing an LOF model (e.g., trained LOF model 710) using various log sizes (e.g., 14, 29, 35, 59, 71, 89, 107, 119, 143, and 179, as illustrated in FIG. 8A). In some embodiments, results 806a can comprise results 802a expressed in terms of test accuracy using an F-measure (also referred to as F-score and/or $F_1$ score and denoted as F1 in FIG. 8A). In some embodiments, results 808a can comprise results 804a expressed in terms of test accuracy using such an F-measure (denoted as F1 in FIG. 8A).

In some embodiments, chart 800a and/or results 802a, 806a can illustrate that performance in terms of false positive (FP) rate of a trained one class SVM model improves as the log size of an inference log (e.g., training log 704) used to train such a model increases beyond a log size of approximately 71 samples of predictions and/or corresponding activation values. In some embodiments, chart 800a and/or results 804a, 808a can illustrate that performance in terms of false positive (FP) rate of an LOF model (e.g., trained LOF model 710) is best with log sizes of an inference log (e.g., training log 704) used to train such a model that are less than a log size of approximately 59 samples of predictions and/or corresponding activation values.

According to multiple embodiments, chart 800b (FIG. 8B) can comprise an illustration of results obtained from implementation of multiple embodiments of the subject disclosure described herein. In some embodiments, chart 800b can comprise an illustration of results 802b, 804b, 806b, 808b obtained from implementation of multiple embodiments of the subject disclosure described herein expressed in terms of percentage (%) of compromised data samples in the log (denoted in the X-axis of chart 800b) versus true positive (TP) rate (denoted in the Y-axis of chart 800b). In some embodiments, such a percentage (%) of compromised data samples in the log (X-axis of chart 800b) can comprise a percentage (%) of predictions and/or corresponding activation values in an inference log (e.g., training log 704) that are generated by a trained model (e.g., trained model 606) based on receipt of one or more backdoor trigger requests. For example, such a percentage (%) of compromised data samples in the log (X-axis of chart 800b) can comprise a percentage (%) of predictions and/or corresponding activation values in an inference log (e.g., training log 704) that are associated with one or more backdoor trigger requests submitted to a trained model (e.g., that are associated with one or more adversarial backdoor attacks on a trained model). In some embodiments, an inference log (e.g., training log 704) comprising such a percentage (%) of compromised data samples can be used to train one or more models to detect a backdoor trigger request submitted to a trained model (e.g., trained model 606), where results 802b, 804b, 806b, 808b can represent results obtained from implementing such one or more models multiple times using inference logs having various percentages (%) of compromised data samples to train such model(s) prior to implementation.

In some embodiments, results 802b can comprise results obtained from training and implementing a one class SVM model (denoted as 1ClassSVM in FIG. 8B) using inference logs having various percentages (%) of compromised data samples (e.g., 0.00%, 0.56%, 1.68%, 2.79%, 3.91%, and 4.47%, as illustrated in FIG. 8B). In some embodiments, results 804b can comprise results obtained from training and implementing an LOF model (e.g., trained LOF model 710) using inference logs having various percentages (%) of compromised data samples (e.g., 0.00%, 0.56%, 1.68%, 2.79%, 3.91%, and 4.47%, as illustrated in FIG. 8B). In some embodiments, results 806b can comprise results 802b expressed in terms of test accuracy using an F-measure (also referred to as F-score and/or $F_1$ score and denoted as F1 in FIG. 8A). In some embodiments, results 808b can comprise results 804b expressed in terms of test accuracy using such an F-measure (denoted as F1 in FIG. 8A).

In some embodiments, chart 800b and/or results 802b, 806b can illustrate that performance in terms of true positive (TP) rate of a trained one class SVM model worsens as the percentage (%) of compromised data samples in an inference log (e.g., training log 704) used to train such a model increases beyond a percentage (%) of approximately 0.56%. In some embodiments, chart 800b and/or results 804b, 808b can illustrate that an LOF model (e.g., trained LOF model 710) that is trained using inference logs having percentages (%) of compromised data samples ranging from 0.00% to approximately 4.47% performs relatively better than a trained one class SVM model for all such percentage (%) values tested and depicted in chart 800b.

Figure 8C:
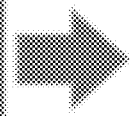
FIG. 8C illustrates an example, non-limiting table that can facilitate detection of an adversarial backdoor attack on a trained model at inference time in accordance with one or more embodiments described herein.

FIG. 8C illustrates an example, non-limiting table 800c that can facilitate detection of an adversarial backdoor attack on a trained model at inference time in accordance with one or more embodiments described herein. Repetitive description of like elements and/or processes employed in respective embodiments is omitted for sake of brevity.

According to multiple embodiments, table 800c can comprise a summary representation of charts 800a, 800b. In some embodiments, table 800c can illustrate that an LOF model (denoted as Novelty(LOF) in FIG. 8C) can outperform a one class SVM model (denoted as 1ClassSVM in FIG. 8C) in terms of log size, true positive results, false positive (FP) results, and/or sensitivity to a compromised inference log (e.g., an inference log having one or more compromised data samples) used to train such models.

Figure 8D:
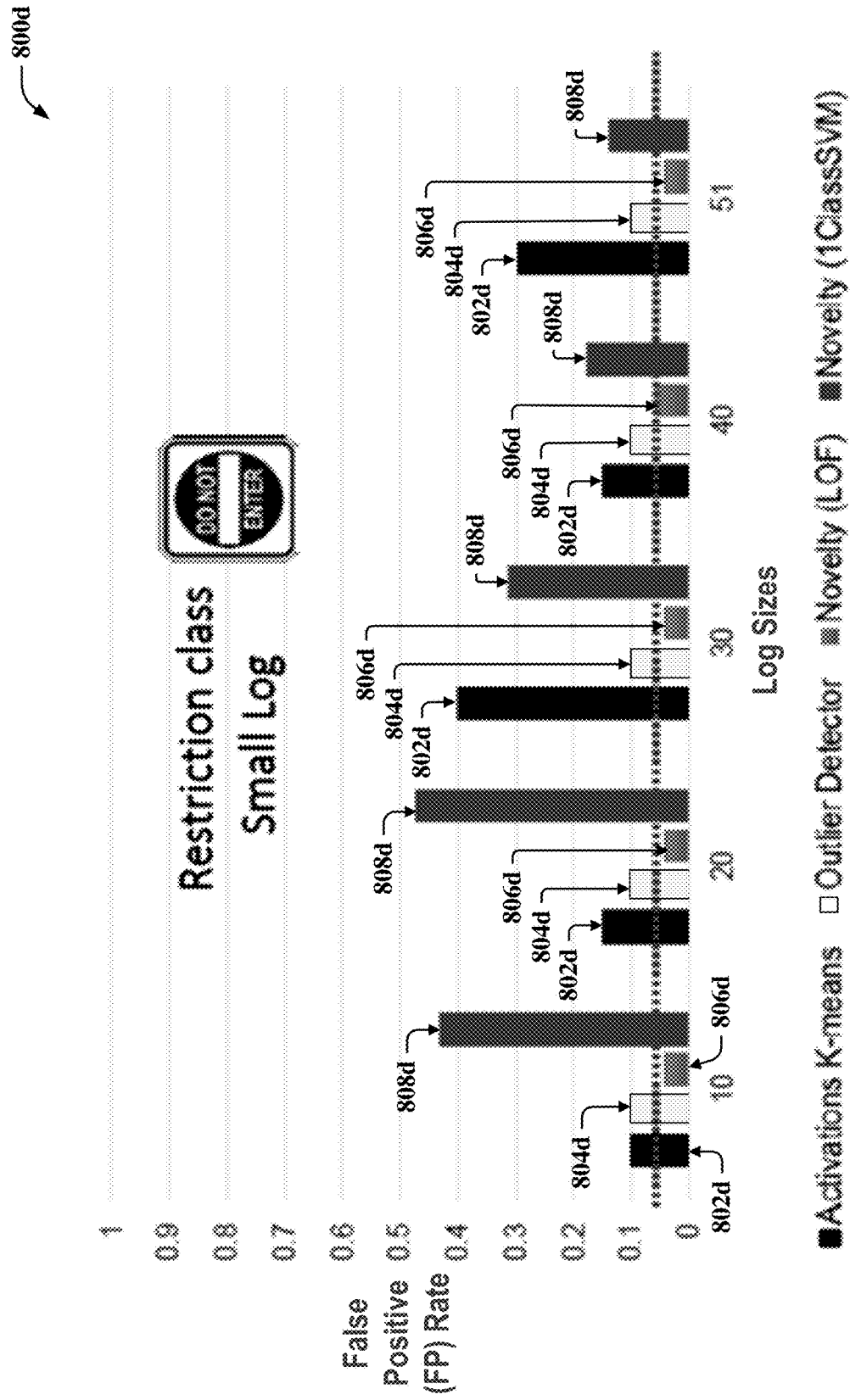
FIG. 8D illustrates example, non-limiting chart that can facilitate detection of an adversarial backdoor attack on a trained model at inference time in accordance with one or more embodiments described herein.

FIG. 8D illustrates example, non-limiting chart 800d that can facilitate detection of an adversarial backdoor attack on a trained model at inference time in accordance with one or more embodiments described herein. Repetitive description of like elements and/or processes employed in respective embodiments is omitted for sake of brevity.

According to multiple embodiments, chart 800d can comprise an example, non-limiting alternative embodiment of chart 800a. In some embodiments, chart 800d can comprise an illustration of results obtained from implementation of multiple embodiments of the subject disclosure described herein. In some embodiments, chart 800d can comprise an illustration of results 802d, 804d, 806d, 808d obtained from implementation of multiple embodiments of the subject disclosure described herein expressed in terms of log size (denoted in the X-axis of chart 800d) versus false positive (FP) rate (denoted in the Y-axis of chart 800d). In some embodiments, such a log size (X-axis of chart 800d) can comprise a size of an inference log (e.g., training log 704) having a certain quantity of predictions and/or corresponding activation values generated by a trained model (e.g., trained model 606) based on inference requests submitted to such a trained model, where such a certain quantity of predictions and/or corresponding activation values is indicative of the size of such an inference log. In some embodiments, such an inference log (e.g., training log 704) can be used to train one or more models to detect a backdoor trigger request submitted to a trained model (e.g., trained model 606), where results 802d, 804d, 806d, 808d can represent results obtained from implementing such one or more models multiple times using various log sizes to train such model(s) prior to implementation. In some embodiments, such a trained model (e.g., trained model 606) can comprise a compromised model.

In some embodiments, results 802d can comprise results obtained from training and implementing an activation clustering model (denoted as Activations K-means in FIG. 8D) using various log sizes (e.g., 10, 20, 30, 40, and 51, as illustrated in FIG. 8D). In some embodiments, results 804d can comprise results obtained from training and implementing an outlier detector model (denoted as Outlier Detector in FIG. 8D) using various log sizes (e.g., 10, 20, 30, 40, and 51, as illustrated in FIG. 8D). In some embodiments, results 806d can comprise results obtained from training and implementing a novelty LOF model (denoted as Novelty (LOF) in FIG. 8D) using various log sizes (e.g., 10, 20, 30, 40, and 51, as illustrated in FIG. 8D). In some embodiments, results 808d can comprise results obtained from training and implementing a novelty one class SVM model (denoted as Novelty (1ClassSVM) in FIG. 8D) using various log sizes (e.g., 10, 20, 30, 40, and 51, as illustrated in FIG. 8D).

In some embodiments, chart 800d and/or results 806d can illustrate that a novelty LOF model (e.g., trained LOF model 710) can consistently (e.g., repeatedly) produce the least amount of false positive (FP) results compared to that of the other models tested and depicted in FIG. 8D. For example, chart 800d and/or results 806d can illustrate that a novelty LOF model (e.g., trained LOF model 710) can consistently (e.g., repeatedly) produce less than approximately 5% of false positive (FP) results.

In some embodiments, adversarial attack detection system 102 can be associated with various technologies. For example, adversarial attack detection system 102 can be associated with artificial intelligence technologies, machine learning technologies, adversarial artificial intelligence technologies, adversarial machine learning technologies, cloud computing environment technologies, computer technologies, server technologies, information technology (IT) technologies, internet-of-things (IoT) technologies, automation technologies, and/or other technologies.

In some embodiments, adversarial attack detection system 102 can provide technical improvements to systems, devices, components, operational steps, and/or processing steps associated with the various technologies identified above. For example, adversarial attack detection system 102 can automatically (e.g., without assistance from a human): employ a model (e.g., trained LOF model 710) to detect at an inference time of a trained model (e.g., trained model 606) a backdoor trigger request based on one or more predictions and/or corresponding activation values generated by such a trained model based on one or more inference requests submitted to the trained model. In this example, an advantage of adversarial attack detection system 102 is that it can employ such a model (e.g., trained LOF model 710) to perform such detection at an inference time of such a trained model (e.g., trained model 606) without accessing and/or analyzing the training data used to train the trained model, thereby providing technical improvements to existing technologies that require access and/or analysis of the training data used to train the model. In another example, by employing a model (e.g., trained LOF model 710) to detect at an inference time of a trained model (e.g., trained model 606) a backdoor trigger request based on one or more predictions and/or corresponding activation values generated by such a trained model based on one or more inference requests submitted to the trained model, adversarial attack detection system 102 can be implemented to detect such a backdoor trigger request submitted to a trained model employed in transfer learning and/or a trained model obtained from a model market place. In another example, by employing an LOF model (e.g., trained LOF model 710) to detect at an inference time of a trained model (e.g., trained model 606) a backdoor trigger request based on an inference log comprising a log size of approximately 35 predictions and one or more activation values corresponding to such 35 predictions, adversarial attack detection system 102 can thereby facilitate improved accuracy of such an LOF model in detecting such a backdoor trigger request as is illustrated by chart 800a, chart 800b, table 800c, and/or chart 800d illustrated in FIGS. 8A, 8B, 8C, and 8D, respectively.

In some embodiments, adversarial attack detection system 102 can provide technical improvements to a processing unit (e.g., processor 106) associated with a classical computing device and/or a quantum computing device (e.g., a quantum processor, quantum hardware, superconducting circuit, etc.). For example, by employing a model (e.g., trained LOF model 710) to detect at an inference time of a trained model (e.g., trained model 606) a backdoor trigger request based on one or more predictions and/or corresponding activation values generated by such a trained model based on one or more inference requests submitted to the trained model, adversarial attack detection system 102 can thereby reduce computational cost of a processing unit (e.g., processor 106) associated with such a model by eliminating the need for such a model to analyze the training data used to train the trained model.

In some embodiments, adversarial attack detection system 102 can employ hardware or software to solve problems that are highly technical in nature, that are not abstract and that cannot be performed as a set of mental acts by a human. In some embodiments, some of the processes described herein can be performed by one or more specialized computers (e.g., one or more specialized processing units, a specialized quantum computer, etc.) for carrying out defined tasks related to the various technologies identified above. In some embodiments, adversarial attack detection system 102 and/or components thereof, can be employed to solve new problems that arise through advancements in technologies mentioned above, employment of quantum computing systems, cloud computing systems, computer architecture, and/or another technology.

It is to be appreciated that adversarial attack detection system 102 can utilize various combinations of electrical components, mechanical components, and circuitry that cannot be replicated in the mind of a human or performed by a human, as the various operations that can be executed by adversarial attack detection system 102 and/or components thereof as described herein are operations that are greater than the capability of a human mind. For instance, the amount of data processed, the speed of processing such data, or the types of data processed by adversarial attack detection system 102 over a certain period of time can be greater, faster, or different than the amount, speed, or data type that can be processed by a human mind over the same period of time.

According to several embodiments, adversarial attack detection system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that adversarial attack detection system 102 can include information that is impossible to obtain manually by a human user. For example, the type, amount, or variety of information included in adversarial attack detection system 102, log component 108, analysis component 110, action component 202, verification component 302, trainer component 402, and/or intercept component 502 can be more complex than information obtained manually by a human user.

Figure 9:
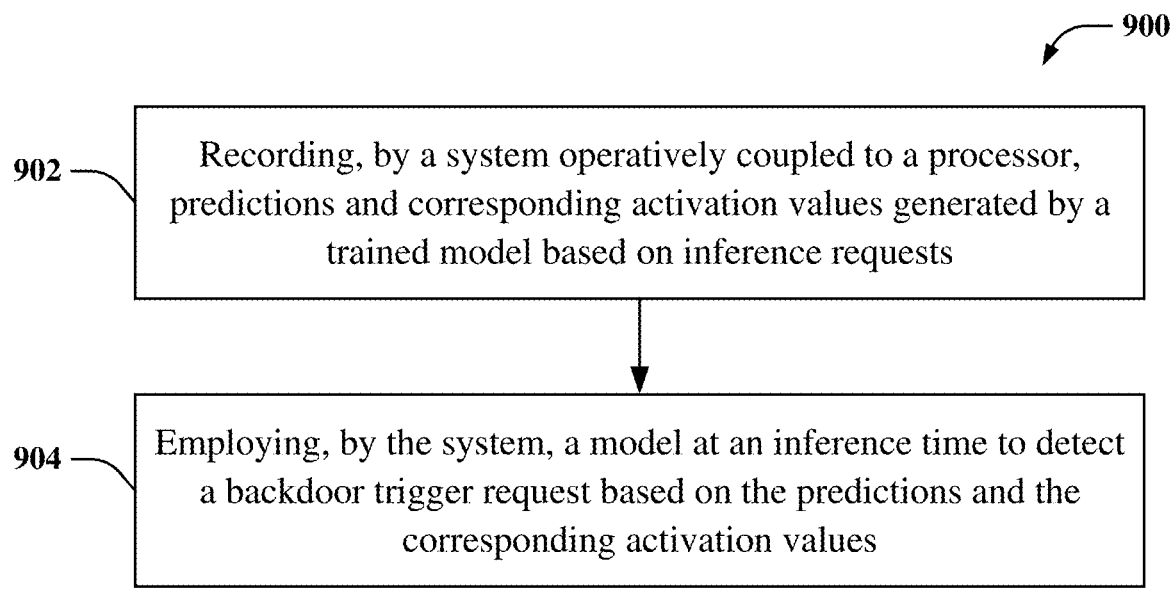
FIG. 9 illustrates a flow diagram of an example, non-limiting computer-implemented method that can facilitate detection of an adversarial backdoor attack on a trained model at inference time in accordance with one or more embodiments described herein.

FIG. 9 illustrates a flow diagram of an example, non-limiting computer-implemented method 900 that can facilitate detection of an adversarial backdoor attack on a trained model at inference time in accordance with one or more embodiments described herein. Repetitive description of like elements and/or processes employed in respective embodiments is omitted for sake of brevity.

In some embodiments, at 902, computer-implemented method 900 can comprise recording, by a system (e.g., via adversarial attack detection system 102 and/or log component 108) operatively coupled to a processor (e.g., processor 106), predictions and corresponding activation values generated by a trained model (e.g., trained model 606) based on inference requests (e.g., inference requests denoted as x in FIG. 6, prediction requests x depicted in FIG. 7, etc.).

In some embodiments, at 904, computer-implemented method 900 can comprise employing, by the system (e.g., via adversarial attack detection system 102, analysis component 110, and/or intercept component 502), a model (e.g., trained LOF model 710) at an inference time to detect a backdoor trigger request (e.g., an adversarial backdoor attack) based on the predictions and the corresponding activation values.

For simplicity of explanation, the computer-implemented methodologies are depicted and described as a series of acts. It is to be understood and appreciated that the subject innovation is not limited by the acts illustrated or by the order of acts, for example acts can occur in various orders or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
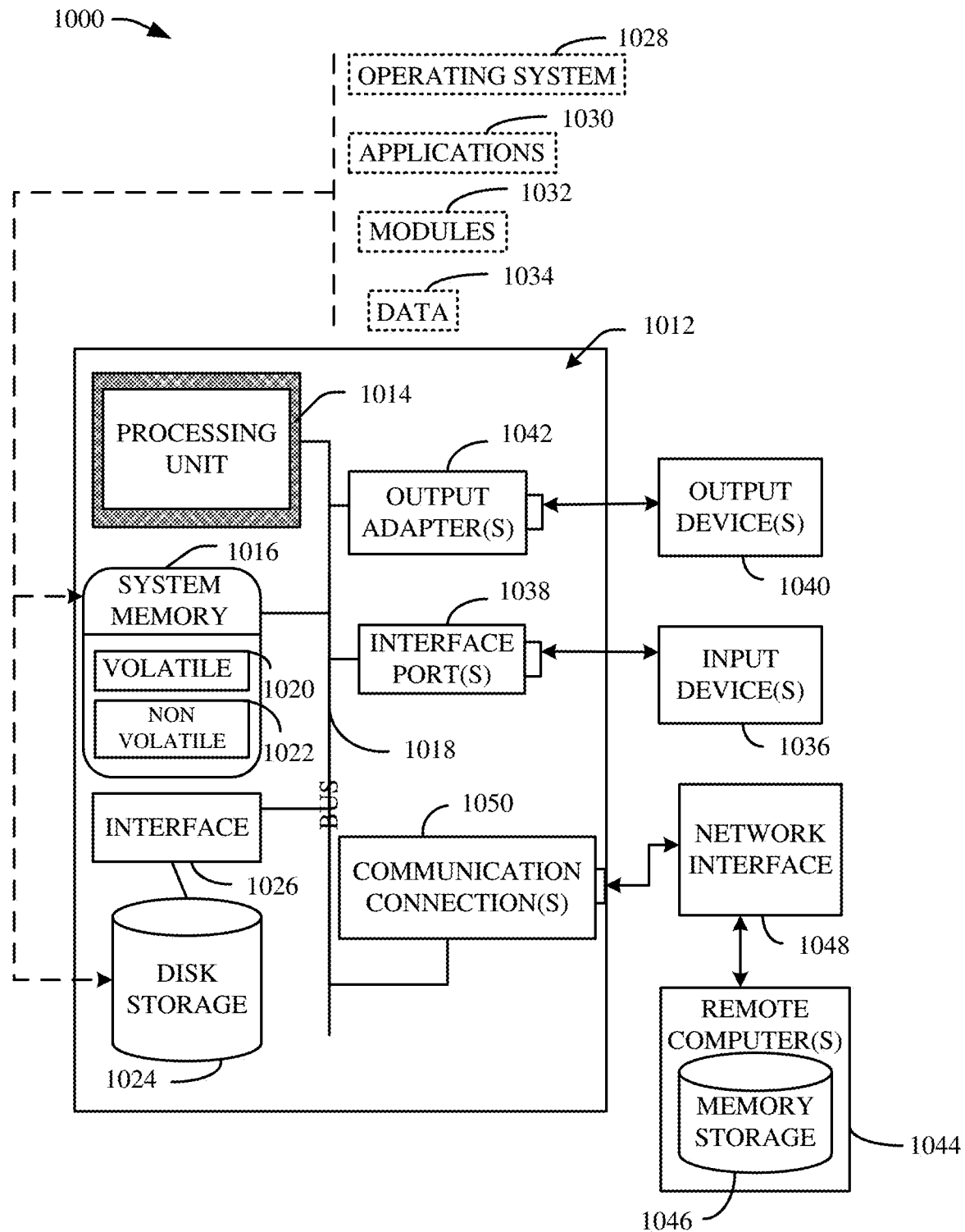
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements and/or processes employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
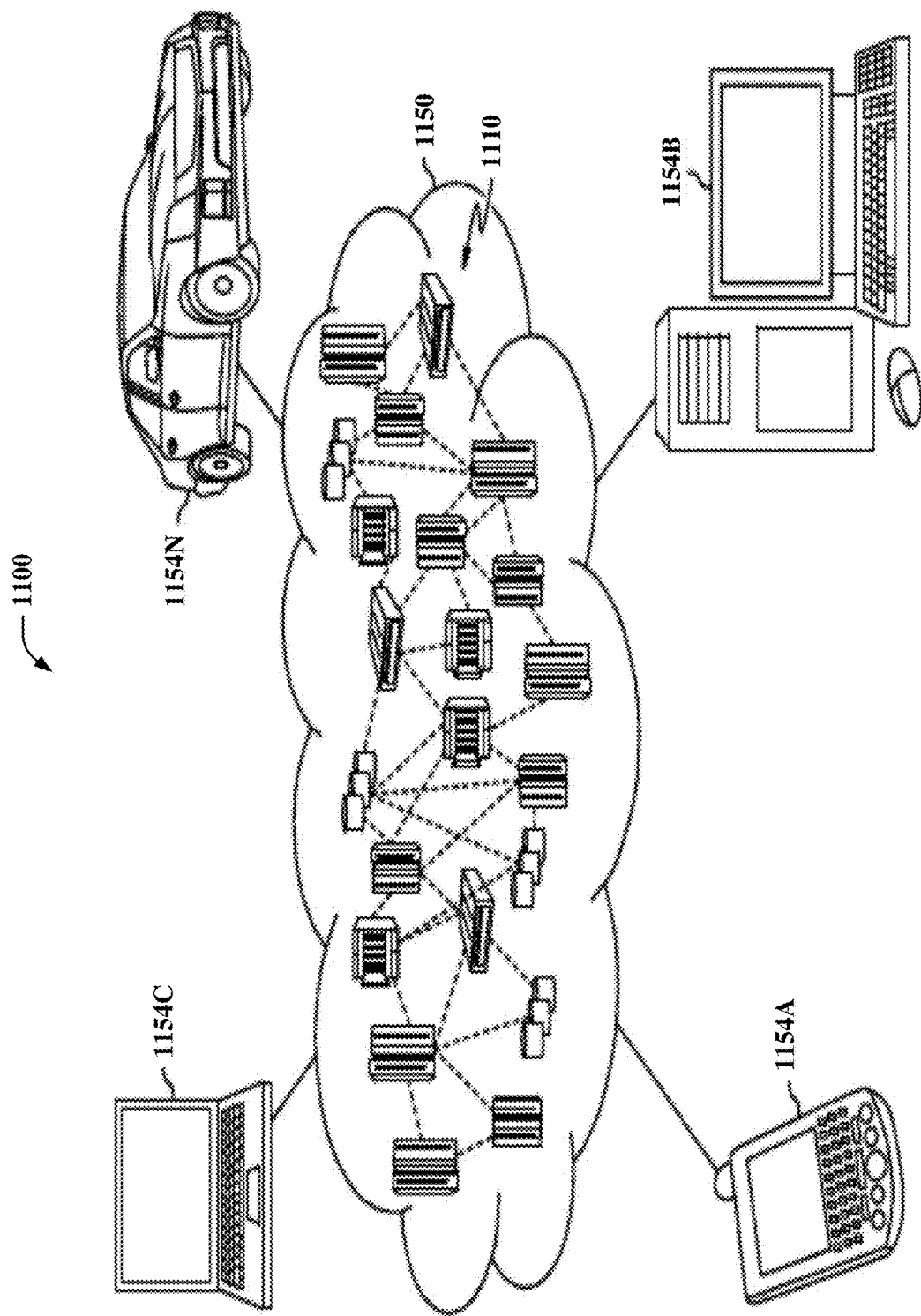
FIG. 11 illustrates a block diagram of an example, non-limiting cloud computing environment in accordance with one or more embodiments of the subject disclosure.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
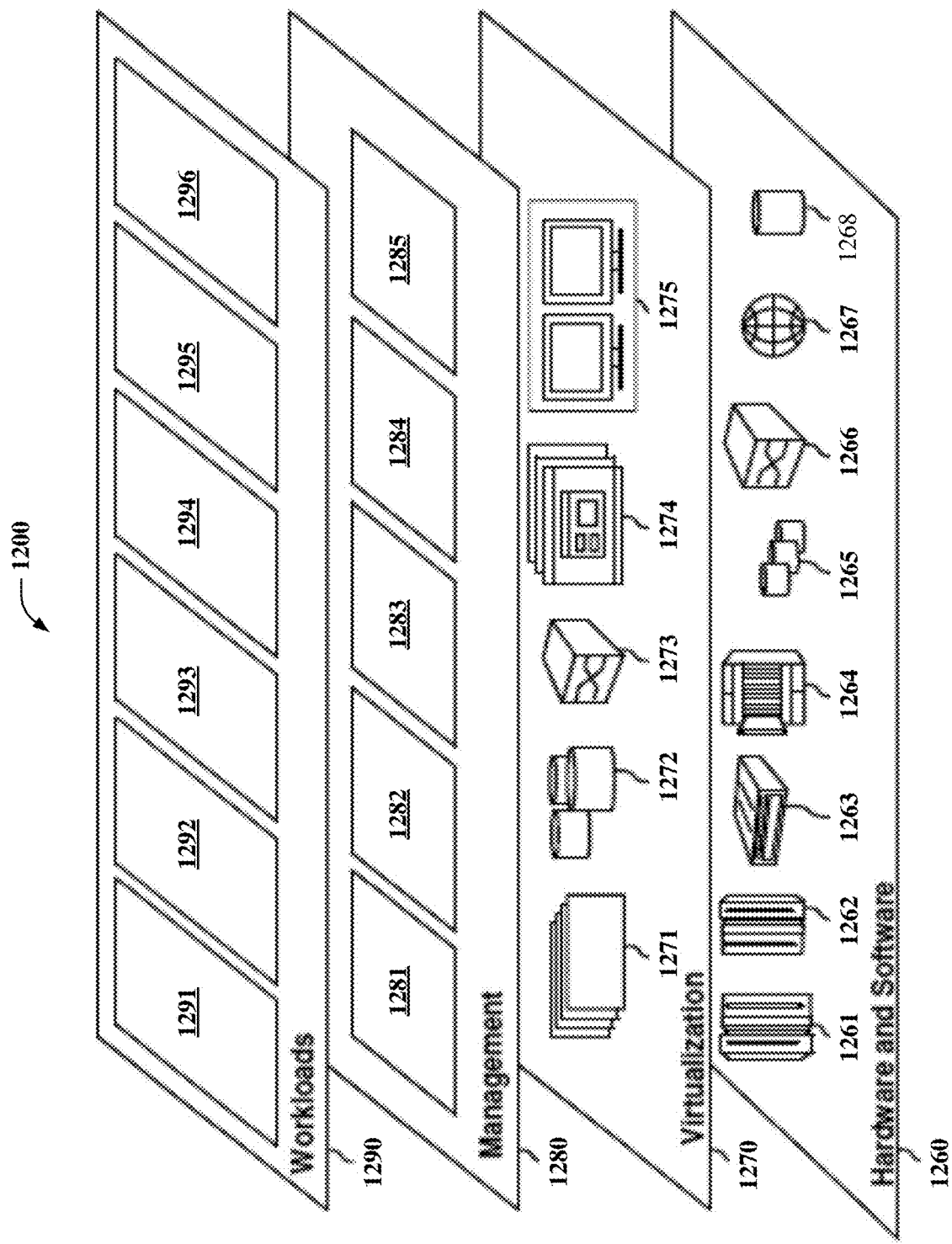
FIG. 12 illustrates a block diagram of example, non-limiting abstraction model layers in accordance with one or more embodiments of the subject disclosure.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and adversarial attack detection software 1296.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a log component that records predictions and corresponding activation values generated by a trained model based on inference requests; and
an analysis component that employs a model at an inference time to detect a backdoor trigger request based on the predictions and the corresponding activation values, wherein the model is selected from a group consisting of a clustering model, an activation clustering model, a heuristic model, an outlier detector model, a trained outlier detector model, a local outlier factor model, a trained local outlier factor model, a novelty detector model, and a trained one class support vector machine model.

2. The system of claim 1, wherein the log component records the predictions and the corresponding activation values from one or more layers of the trained model.

3. The system of claim 1, wherein:
the trained model is selected from a second group consisting of a trained artificial intelligence model, a trained machine learning model, a trained deep learning model, and a trained neural network model.

4. The system of claim 1, wherein the computer executable components further comprise:
a verification component that verifies authenticity of at least one of: one or more of the inference requests; one or more of the predictions; or one or more of the corresponding activation values.

5. The system of claim 1, wherein the computer executable components further comprise:
a trainer component that trains the model based on at least one of: one or more of the inference requests; one or more of the predictions and one or more of the corresponding activation values; one or more verified inference requests; or one or more verified predictions and one or more verified corresponding activation values.

6. The system of claim 1, wherein the computer executable components further comprise:
an intercept component that intercepts an inference request submitted to the trained model and extracts from the trained model at least one of a prediction or one or more corresponding activation values generated in at least one layer of the trained model based on the inference request.

7. The system of claim 1, wherein the computer executable components further comprise:
an action component that deactivates the trained model based on a detected backdoor trigger request.

8. The system of claim 1, wherein the analysis component employs the model at the inference time to detect the backdoor trigger request based on the predictions and the corresponding activation values to facilitate at least one of: improved backdoor trigger request detection accuracy of the model; or reduced computational cost of a processing unit associated with the model.

9. A computer-implemented method, comprising:
recording, by a system operatively coupled to a processor, predictions and corresponding activation values generated by a trained model based on inference requests; and
employing, by the system, a model at an inference time to detect a backdoor trigger request based on the predictions and the corresponding activation values, wherein the model is selected from a group consisting of a clustering model, an activation clustering model, a heuristic model, an outlier detector model, a trained outlier detector model, a local outlier factor model, a trained local outlier factor model, a novelty detector model, and a trained one class support vector machine model.

10. The computer-implemented method of claim 9, wherein the recording comprises:
recording, by the system, the predictions and the corresponding activation values from one or more layers of the trained model.

11. The computer-implemented method of claim 9, wherein:
the trained model is selected from a second group consisting of a trained artificial intelligence model, a trained deep learning model, and a trained neural network model.

12. The computer-implemented method of claim 9, further comprising:
verifying, by the system, authenticity of at least one of: one or more of the inference requests; one or more of the predictions; or one or more of the corresponding activation values.

13. The computer-implemented method of claim 9, further comprising:
training, by the system, the model based on at least one of: one or more of the inference requests; one or more of the predictions and one or more of the corresponding activation values;

one or more verified inference requests; or one or more verified predictions and one or more verified corresponding activation values.

14. The computer-implemented method of claim 9, further comprising:
    intercepting, by the system, an inference request submitted to the trained model; and
    extracting, by the system, from the trained model at least one of a prediction or one or more corresponding activation values generated in at least one layer of the trained model based on the inference request.

15. The computer-implemented method of claim 9, further comprising:
    deactivating, by the system, the trained model based on a detected backdoor trigger request.

16. A computer program product facilitating detection of an adversarial backdoor attack on a trained model at inference time, the computer program product comprising a computer readable storage medium having program instructions embodied therewith, the program instructions executable by a processor to cause the processor to:
    record, by the processor, predictions and corresponding activation values generated by a trained model based on inference requests; and
    employ, by the processor, a model at an inference time to detect a backdoor trigger request based on the predictions and the corresponding activation values, wherein the model is selected from a group consisting of a clustering model, an activation clustering model, a heuristic model, an outlier detector model, a trained outlier detector model, a local outlier factor model, a trained local outlier factor model, a novelty detector model, and a trained one class support vector machine model.

17. The computer program product of claim 16, wherein the program instructions are further executable by the processor to cause the processor to:
    record, by the processor, the predictions and the corresponding activation values from one or more layers of the trained model.

18. The computer program product of claim 16, wherein:
    the trained model is selected from a second group consisting of a trained artificial intelligence model, a trained machine learning model, a trained deep learning model, and a trained neural network model.

19. The computer program product of claim 16, wherein the program instructions are further executable by the processor to cause the processor to:
    train, by the processor, the model based on at least one of: one or more of the inference requests; one or more of the predictions and one or more of the corresponding activation values; one or more verified inference requests; or one or more verified predictions and one or more verified corresponding activation values.

20. The computer program product of claim 16, wherein the program instructions are further executable by the processor to cause the processor to:
    intercept, by the processor, an inference request submitted to the trained model; and
    extract, by the processor, from the trained model at least one of a prediction or one or more corresponding activation values generated in at least one layer of the trained model based on the inference request.

* * * * *